US010078138B2

(12) United States Patent
Chhokra et al.

(10) Patent No.: US 10,078,138 B2
(45) Date of Patent: Sep. 18, 2018

(54) DOPPLER SHIFT CORRECTION USING THREE-DIMENSIONAL BUILDING MODELS

(71) Applicant: Apple Inc., Cupertino, CA (US)

(72) Inventors: Kumar Gaurav Chhokra, Cupertino, CA (US); Glenn Donald MacGougan, San Jose, CA (US)

(73) Assignee: Apple Inc., Cupertino, CA (US)

(*) Notice: Subject to any disclaimer, the term of this patent is extended or adjusted under 35 U.S.C. 154(b) by 201 days.

(21) Appl. No.: 14/848,241

(22) Filed: Sep. 8, 2015

(65) Prior Publication Data

US 2017/0068001 A1    Mar. 9, 2017

(51) Int. Cl.
*G01S 19/40* (2010.01)
*G01S 19/52* (2010.01)
*G01S 19/44* (2010.01)
*G01S 19/42* (2010.01)
*G01S 19/39* (2010.01)

(52) U.S. Cl.
CPC ............ *G01S 19/40* (2013.01); *G01S 19/39* (2013.01); *G01S 19/42* (2013.01); *G01S 19/428* (2013.01); *G01S 19/44* (2013.01); *G01S 19/52* (2013.01)

(58) Field of Classification Search
CPC .......... G01S 19/40; G01S 19/39; G01S 19/42; G01S 19/428; G01S 19/44; G01S 19/52
USPC .................................................. 342/357.23
See application file for complete search history.

(56) References Cited

U.S. PATENT DOCUMENTS

| 6,590,530 | B2 | 7/2003 | van Diggelen et al. |
| 6,614,386 | B1* | 9/2003 | Moore ............... G01S 13/003 342/160 |
| 6,640,189 | B2 | 10/2003 | Perlmutter et al. |
| 7,647,171 | B2 | 1/2010 | Horvitz et al. |
| 7,907,088 | B2 | 3/2011 | Terashima |
| 9,068,839 | B2 | 6/2015 | Mattila |
| 9,125,019 | B1 | 9/2015 | Heikkila |
| 9,237,417 | B2 | 1/2016 | Marshall et al. |
| 9,408,175 | B2 | 8/2016 | MacGougan et al. |
| 9,448,307 | B2 | 9/2016 | Ben-Moshe et al. |
| 9,681,269 | B2 | 6/2017 | MacGougan et al. |
| 2009/0210156 | A1 | 8/2009 | Riley et al. |
| 2013/0095849 | A1 | 4/2013 | Pakzad |
| 2013/0271324 | A1 | 10/2013 | Sendonaris et al. |
| 2013/0278465 | A1 | 10/2013 | Owen |
| 2013/0324154 | A1* | 12/2013 | Raghupathy ............ G01S 19/10 455/456.1 |

(Continued)

OTHER PUBLICATIONS

Notice of Allowance for U.S. Appl. No. 14/503,046 dated Mar. 28, 2016, 12 pages.

(Continued)

*Primary Examiner* — Harry K Liu
(74) *Attorney, Agent, or Firm* — Fish & Richardson P.C.

(57) ABSTRACT

Techniques for GNSS positioning using three-dimensional (3D) building models are described. A processor can determine a probable path for a signal from a GNSS space vehicle (e.g., a satellite) to reach the GNSS receiver. The probable path can include one or more specular reflections. The processor can determine a Doppler correction based on the probable path, including inverting a sense of a vector of the Doppler correction for each reflection. The processor can then incorporate the Doppler correction in an estimated velocity of the mobile device, an estimated position of the mobile device, or both.

20 Claims, 16 Drawing Sheets

(56) References Cited

U.S. PATENT DOCUMENTS

| | | |
|---|---|---|
| 2014/0016115 A1 | 1/2014 | Shimon et al. |
| 2014/0375494 A1 | 12/2014 | Fleming et al. |
| 2015/0032370 A1 | 1/2015 | Garin |
| 2016/0327654 A1* | 11/2016 | Kumabe ................. G01S 19/49 |

OTHER PUBLICATIONS

Supplemental Notice of Allowance for U.S. Appl. No. 14/503,046 dated Jun. 13, 2016, 2 pages.
"Urban Localization and 3D Mapping using GNSS Shadows," Inside GNSS, Sep./Oct. 2015, pp. 60-66.
Wang et al., "GNSS Shadow Matching: Improving Urban Positioning Accuracy Using a 3D City Model with Optimized Visibility Scoring Scheme," Navigation: Journal of The Institute of Navigation, Received Oct. 2012, Revised Mar. 2013, pp. 195-207.

\* cited by examiner

DOPPLER SHIFT CORRECTION USING THREE-DIMENSIONAL BUILDING MODELS

TECHNICAL FIELD

This disclosure relates generally to location determination using radio signals.

BACKGROUND

Many modern mobile devices such as smart phones or wearable devices have navigation functions that depend on global navigation satellite system (GNSS) signals. In challenging GNSS environment (e.g., "urban canyons" surround by signal-blocking high-rise buildings), non-line of sight (NLOS) signals and multipath interference can cause positioning errors. Using conventional technologies, a processor can identify and reject NLOS and other distorted signals by examining signal structure. For example, the processor can identify and reject signals that have low carrier-to-noise density ($C/N_0$) or weak signals that are inconsistent with strong signals. The conventional technologies typically can identify and reject clearly distorted signals. These technologies can fail in the presence of specular reflectors, which can reflect GNSS signals with almost no loss but can distort pseudorange and pseudorange rate measurements. In addition, if $C/N_0$ strength is used as a metric of fidelity of a position, velocity and time (PVT) solution derived from the specularly reflected signals, a processor can be overconfident about the PVT solution. In such situations, the horizontal uncertainty of position error (HEPE) or a horizontal position uncertainty in the PVT solution can be biased incorrectly lower.

SUMMARY

Techniques for GNSS positioning using three-dimensional (3D) building models are described. A processor of a mobile device can determine a lower bound of uncertainty for an estimated position of the mobile device. The processor can receive an estimated position from an estimator of a GNSS receiver of the mobile device. The processor can acquire geographic feature data including 3D building models of buildings and other geographic features that are located near the estimated position and may reflect GNSS signals. The processor can then determine a lower bound of uncertainty of the estimated position, regardless of an estimated uncertainty provided by a GNSS estimator. The lower bound can be higher (e.g., have a greater error margin) than the uncertainty value provided by the GNSS estimator. The processor can then present the estimated position, in association with an error margin corresponding to the lower bound of uncertainty, on a map user interface of the mobile device.

A processor of a mobile device can provide positioning corrections based 3D building models. The mobile device can receive an estimated position from a positioning source (e.g., a GNSS receiver, a Wi-Fi™ positioning component, a cellular positioning component or a dead-reckoning unit) of the mobile device. The mobile device can acquire geographic feature data including 3D building models of buildings and other geographic features that are located near the estimated position and may reflect GNSS signals. The processor can then determine a probable path for a signal from a GNSS space vehicle (e.g., a satellite) to reach the GNSS receiver. The probable path can include one or more specular reflections. The processor can determine a Doppler correction based on the probable path, including inverting a sense of a vector of the Doppler correction for each reflection. The processor can then incorporate the Doppler correction in an estimated velocity of the mobile device, an estimated position of the mobile device, or both. Alternatively or additionally, the processor can provide the Doppler correction to the GNSS receiver for pseudorange and pseudorange rate estimation.

The features described in this specification can achieve one or more advantages. For example, a mobile device implementing the techniques can reduce positioning errors in challenging GNSS environment including urban canyons. The mobile device can reduce or avoid over-confident location estimation in places where specular reflection produces nearly lossless reflections of GNSS signals in terms of C/No but distorts paths of the signals. Using the Doppler correction for specular reflections, a mobile device implementing the techniques can provide position and velocity estimates that are more accurate that available in conventional technologies. The technology described in this specification can help distinguishing between measured Doppler uncertainty due to clock drift and Doppler uncertainty due to mis-estimation of relative motion between the mobile device and a satellite. The distinction can decrease positioning uncertainty and avoid incorrect position solutions.

The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

Like reference symbols in the various drawings indicate like elements.

DETAILED DESCRIPTION

GNSS Receiver Architecture

Figure 1:
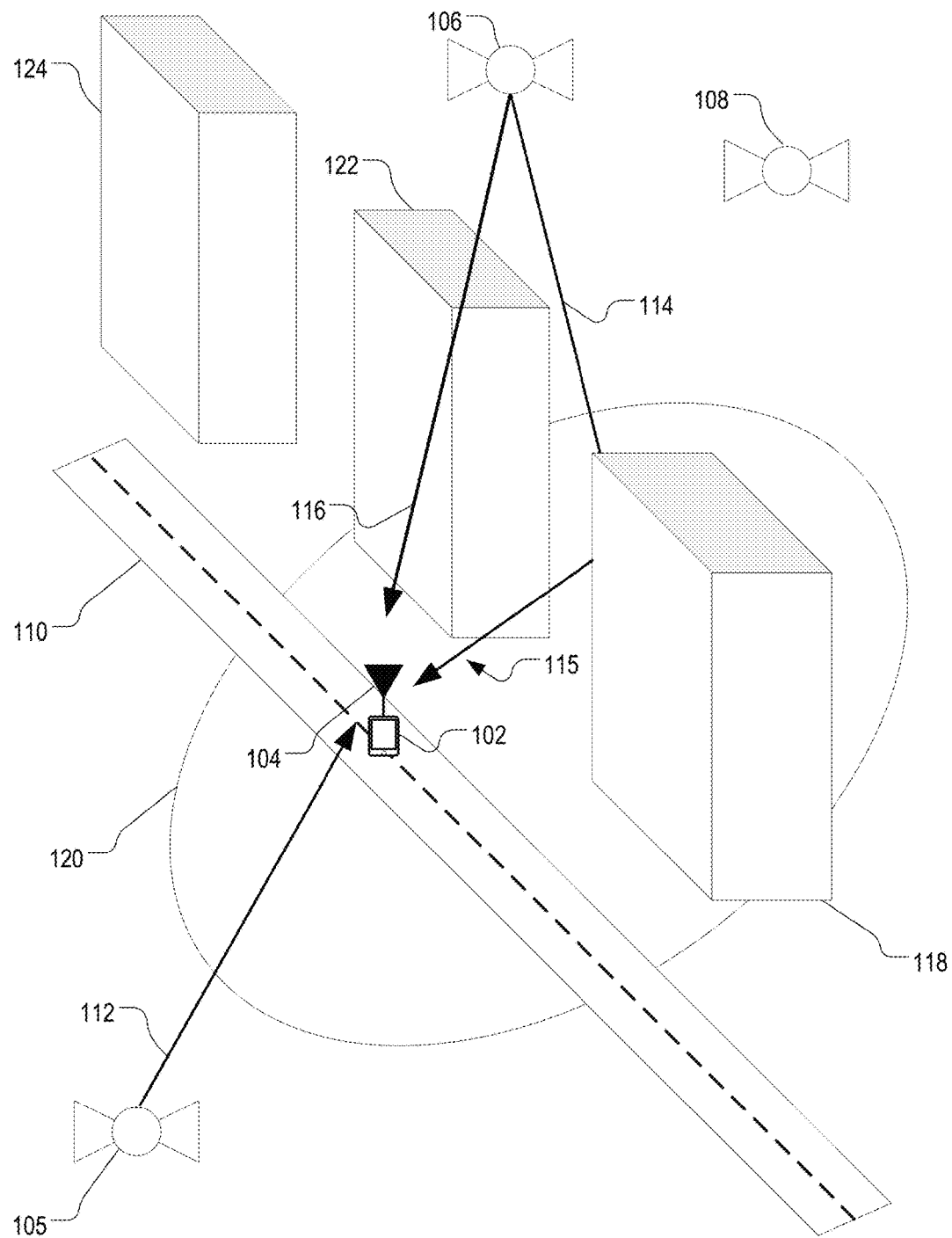
FIG. 1 is a diagram illustrating an example mobile device handling signals affected by multipath interferences.

FIG. 1 is a diagram illustrating an example mobile device 102 handling signals affected by multipath interference. Mobile device 102 can include a GNSS receiver having antenna 104 and an estimator. In the example shown, antenna 104 can detect signals from satellites 105, 106 and 108 when antenna 104 is located at a particular location (e.g., on road 110) at a particular time. The estimator can determine a pseudorange and a pseudorange rate based on the signals.

At least some signals from satellites 105, 106 and 108 can reach antenna 104 through one or more reflections. In the example shown, signals from satellites 105, 106 reach antenna 104 through signal paths 112, 114, respectively. Signal path 114 includes reflection path 115 caused by the signal reflecting off a surface of building 118. Reflection path 115 causes the signal from satellite 106 to travel a total path length that is longer than direct LOS path 116 from satellite 106 to antenna 104. The surface of building 118 can produce a specular reflection that is nearly lossless. Accordingly, the signal traveling along reflection path 115 can reach antenna 104 without significant degradation in C/No.

Mobile device 102 can use knowledge of surrounding geographic features, such as buildings 118, 122, 124, to determine possible reflection paths and respective delays of signals on the reflection paths. In some implementations, mobile device 102 can obtain initial location bound 120 defining a geographic area that includes possible locations of antenna 104. Mobile device 102 can determined initial location bound 120 based on an estimated position, also referred to as an estimated location.

Mobile device 102 can determined the estimated position using GNSS signals without multipath correction, using Wi-Fi™ trilateration, using cellular information or using other location determination techniques. Initial location bound 120 can have a size (e.g., a radius if a circular bound) corresponding to an uncertainty of the estimated position. Initial location bound 120 can have any size or shape. For example, initial location bound can be circular, elliptical or square. In some implementations, initial location bound 120 is a grid divided into a number of grid cells. Each grid cell can correspond to a possible location of antenna 104, designated as a candidate location. The grid cells can be spaced apart from one another according to a precision of the GNSS receiver under ideal conditions (e.g., one meter apart).

Mobile device 102 can obtain, from a local cache or a network database, a 3D building model representing features of structures that may reflect signals reaching initial location bound 120. The features can include locations, shapes, sizes and heights of mirror-like surfaces of buildings 118, 122 and 124. Mobile device 102 can obtain locations of satellites 105, 106 and 108 from the GNSS signals or from a network resource or from these satellites.

Mobile device 102 can determine a lower bound of uncertainty given mirror-like surfaces represented in the 3D building model. For example, more buildings and more mirror-like surfaces can increase the lower bound of uncertainty. An increased lower bound of uncertainty can correspond to a larger error margin. The lower bound of uncertainty may be greater than initial location bound 120. In such cases, mobile device can present the lower bound of uncertainty as the uncertainty area associated with an estimated position of mobile device 102.

In addition to determining a lower bound for error margin, mobile device 102 can provide corrections to the GNSS receiver using an application programming interface (API) for the GNSS receiver. The corrections can include Doppler corrections for determining location and velocity of mobile device 102. The corrections can include different covariance matrices for corresponding to different categories of terrain as pseudorange corrections. The GNSS receiver can estimate a pseudorange or pseudorange rate using the covariance matrices.

For example, mobile device 102 can provide to the GNSS receiver a list of pseudorange corrections ("$\delta_{Terrain}$") to be used for one or more satellites. The GNSS receiver can then determine a range, in a PVT solution calculation, by taking the pseudorange corrections $\delta_{Terrain}$ into calculation (1) as listed below.

$$\rho = R + c(\delta_r - \delta^s) + \delta_{Terrain} + \varepsilon, \qquad (1)$$

where $\rho$ is a pseudorange between antenna 104 and a satellite, R is a true range between antenna 104 and the satellite, $\delta_r$ is a receiver clock error, $\delta^s$ is a satellite clock error, c is a speed of light, $\delta_{Terrain}$ is the pseudorange correction for a particular type of terrain in which mobile device 102 is located, and $\varepsilon$ is a random tracking error. Mobile device 102 can then determine a position and velocity using the corrected pseudorange.

Figure 2:
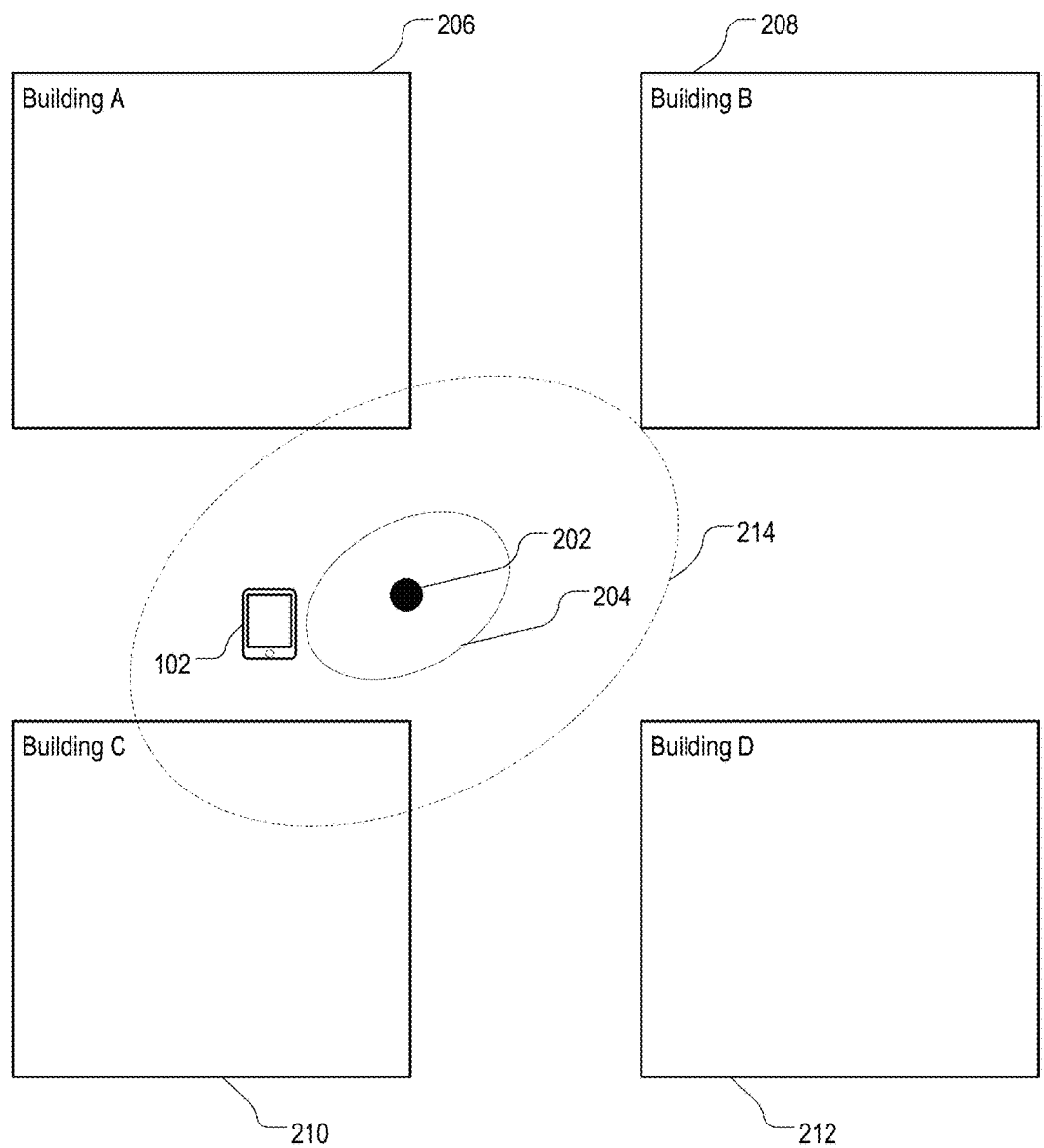
FIG. 2 is diagram illustrating example techniques of providing a lower bound of uncertainty of an estimated position using 3D building models.

FIG. 2 is diagram illustrating example techniques of providing a lower bound of uncertainty of an estimated position using 3D building models. A GNSS receiver of mobile device 102 can determine estimated position 202 of mobile device 102. Estimated position 202 can include latitude, longitude and optionally, altitude coordinates. Estimated position 202 can be associated with estimated uncertainty 204. Estimated uncertainty 204 can correspond to an error margin of estimated position 202 as determined by an estimator of the GNSS receiver.

Mobile device 102 can obtain a 3D building model including information of geographic features near estimated position 202. The geographic features can include location and height of buildings or other structures. The geographic features are near estimated position 202 if the geographic features can block or reflect GNSS signals from one or more satellites to estimated position 202. In the example shown, the 3D building model includes locations and heights of buildings 206, 208, 210 and 212.

Mobile device 102 can determine whether a count of the geographic features that may block or reflect GNSS signals satisfies a feature count threshold value (e.g., at least three or five). Mobile device 102 can determine whether an average height of the geographic features satisfies a feature height threshold value (e.g., at least ten or twelve meters). The feature count threshold value and feature height threshold value can be determined empirically.

Upon determining that the feature count threshold and feature count threshold are satisfied, mobile device 102 can determine lower bound of uncertainty, also referred to as uncertainty floor, 214. Lower bound of uncertainty 214 can be greater than estimated uncertainty 204, indicating that in the GNSS environment around estimated position 202, it is unlikely that the GNSS estimator can derive an error margin as small as estimated uncertainty 204.

Mobile device 102 can determine a size and shape of lower bound of uncertainty 214 in various ways. In some implementations, mobile device 102 can determine that lower bound of uncertainty 214 is a circle having a constant radius (e.g., 50 meters). In some implementations, mobile device 102 can determine that lower bound of uncertainty 214 has a size that corresponds to a width of an average road in the 3D building model, or a width of a road on which mobile device 102 is located, times a factor (e.g., two).

In some implementations, mobile device 102 can determine lower bound of uncertainty 214 based on empirical statistics of GNSS performance as a function of number and height of buildings near estimated position 202.

In some implementations, mobile device 102 can determine lower bound of uncertainty 214 by estimating satellite visibility at estimated position 202 using the 3D building model. Mobile device 102 can then estimate a quality of measurements of GNSS signals. The measurements can include pseudoranges and pseudorange rates. Mobile device 102 can compute weighted dilution of precision based on number of visible satellites. Mobile device 102 can determine a line of sight (LOS) vector Ui for a given satellite SVi using equation (2) below.

$$U_i=[\cos(El_i)*\sin(Az_i), \cos(El_i)*\cos(Az_i), \sin(El_i)], \quad (2)$$

where $U_i$ is an LOS unit vector for satellite $SV_i$, directed from the user's location to SVi, $Az_i$ is the azimuth for satellite $SV_i$, and $El_i$ is the elevation for satellite $SV_i$. Mobile device 102 can then determine a geometry matrix as follows, using the LOS vectors for the visible satellites and using equation (3) below.

$$G = \begin{bmatrix} -U_1, 1 \\ -U_2, 1 \\ \ldots \\ -U_n, 1 \end{bmatrix}, \quad (3)$$

where G is the geometry matrix and $U_i$ is an LOS vector for satellite $SV_i$.

Mobile device 102 can determine a dilution of precision (DOP) matrix H as follows, using the geometry matrix G as determined above and using equation (4) below.

$$H=\mathrm{inv}(G'*G), \quad (4)$$

where G' is the transpose of geometry matrix G.

Mobile device 102 can determine a horizontal dilution of precision (HDOP) as follows, using the DOP matrix H as determined above and using equation (5) below.

$$\mathrm{HDOP}=\sqrt{H(1,1)+H(2,2)} \quad (5)$$

Mobile device 102 can then determine lower bound of uncertainty 214 using the horizontal dilution of precision HDOP and equation (6) below.

$$\mathrm{unc\_floor}=\mathrm{HDOP}*\sigma_{URE}, \quad (6)$$

where unc_floor is lower bound of uncertainty 214 and $\sigma_{URE}$ is a user range error.

In some implementations, mobile device 102 can determine a weight matrix W based on probability of satellite visibility based on the 3D building model. In addition, mobile device 102 can determine the weight matrix W using other factors, e.g., $C/N_0$ of each of the signals. In such implementations, equation (4) above can be modifies as follows, as shown in equation (7) below.

$$H=\mathrm{inv}(G'*W*G), \quad (7)$$

where G is the geometry matrix and W is the weight matrix.

Mobile device 102 can then present estimated position 202 and a new error margin corresponding to lower bound of uncertainty 214. In case lower bound of uncertainty 214 is smaller than estimated uncertainty 204, mobile device 102 can present estimated uncertainty 204 instead. Lower bound of uncertainty 214 can have any geometric shape. For example, lower bound of uncertainty 214 can be a circle, ellipse or polygon.

Figure 3:
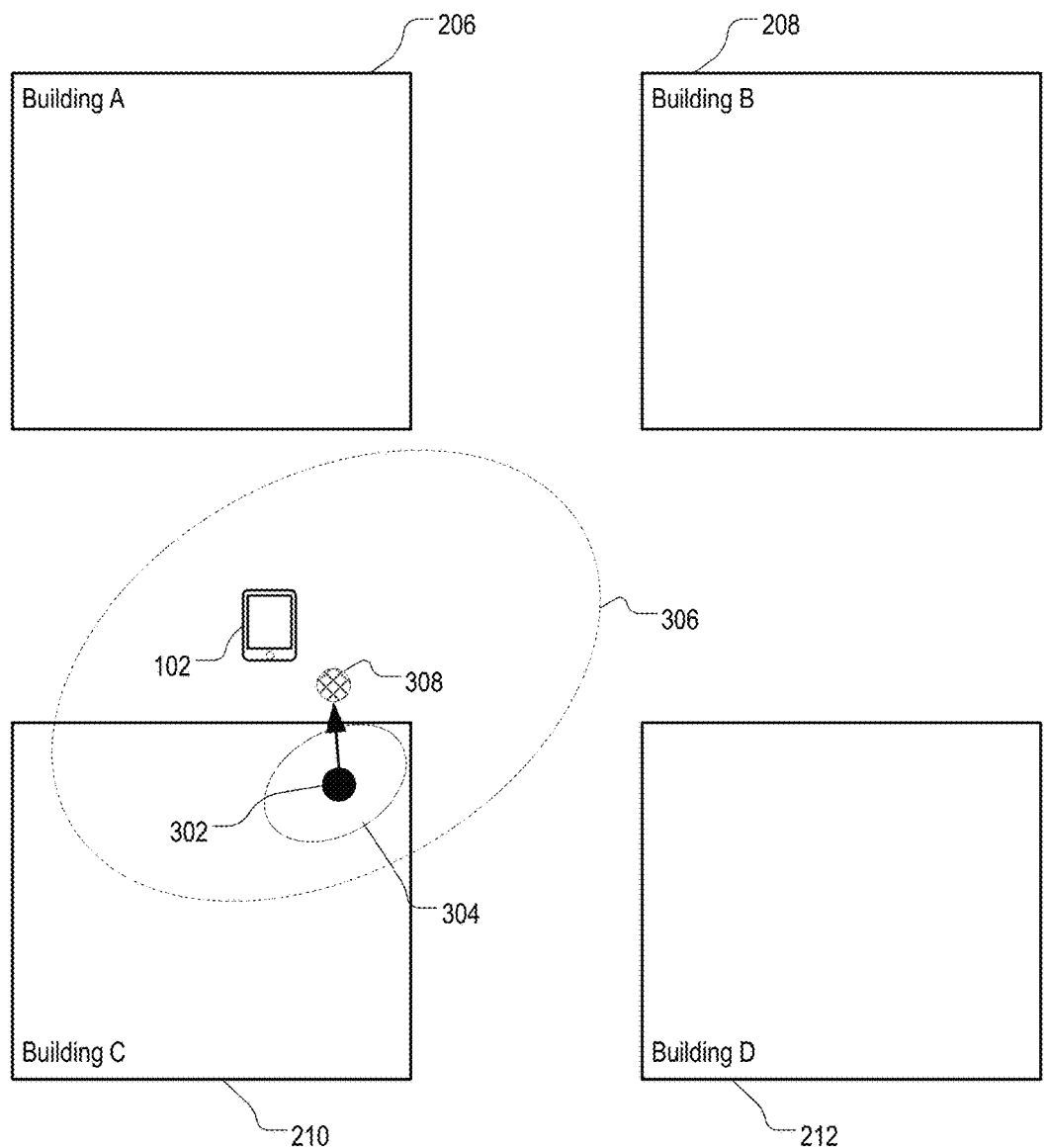
FIG. 3 is a diagram illustrating example techniques of correcting an estimated position using 3D building models.

FIG. 3 is a diagram illustrating example techniques of correcting an estimated position using 3D building models. Mobile device 102 is located outside of building 210. A GNSS receiver of mobile device 102 can determine estimated position 302 of mobile device 102. Due to multipath interferences caused by specular reflections of GNSS signals, the GNSS receiver incorrectly determines latitude and longitude coordinates of mobile device 102, which are located inside of building 210. Estimated position 302 has estimated uncertainty 304. Due to nearly lossless reflections in the signal paths, the GNSS receiver assigns a low uncertainty value to the estimated position 302. Accordingly, estimated uncertainty 304 is small and entirely contained in the footprint of building 210, which is incorrect.

Using techniques described in reference to FIG. 2, mobile device 102 can determine lower bound of uncertainty 306. In some implementations, mobile device 102 can associate lower bound of uncertainty 306 with estimated position 302, and determine if area defined by lower bound of uncertainty 306 extends beyond building 210. If yes, mobile device 102 can present lower bound of uncertainty 306 in association with estimated position 302 on a map user interface. If no, mobile device 102 can enlarge lower bound of uncertainty 306 until the area defined by lower bound of uncertainty 306 extends beyond building 210. Mobile device 102 can then present enlarged lower bound of uncertainty 306 in association with estimated position 302 on a map user interface.

In some implementations, mobile device 102 can adjust estimated position 302 based on the 3D building model. The adjustment can include moving estimated position 302 to new location 308 that is outside of building 210. Moving estimated position 302 to new location 308 can be conditioned upon a velocity of mobile device 102. For example, mobile device 102 can move estimated position 302 upon determining that a magnitude of the velocity of mobile device 102 exceeds a speed threshold, indicating, for example, mobile device 102 is in a moving vehicle.

Figure 4:
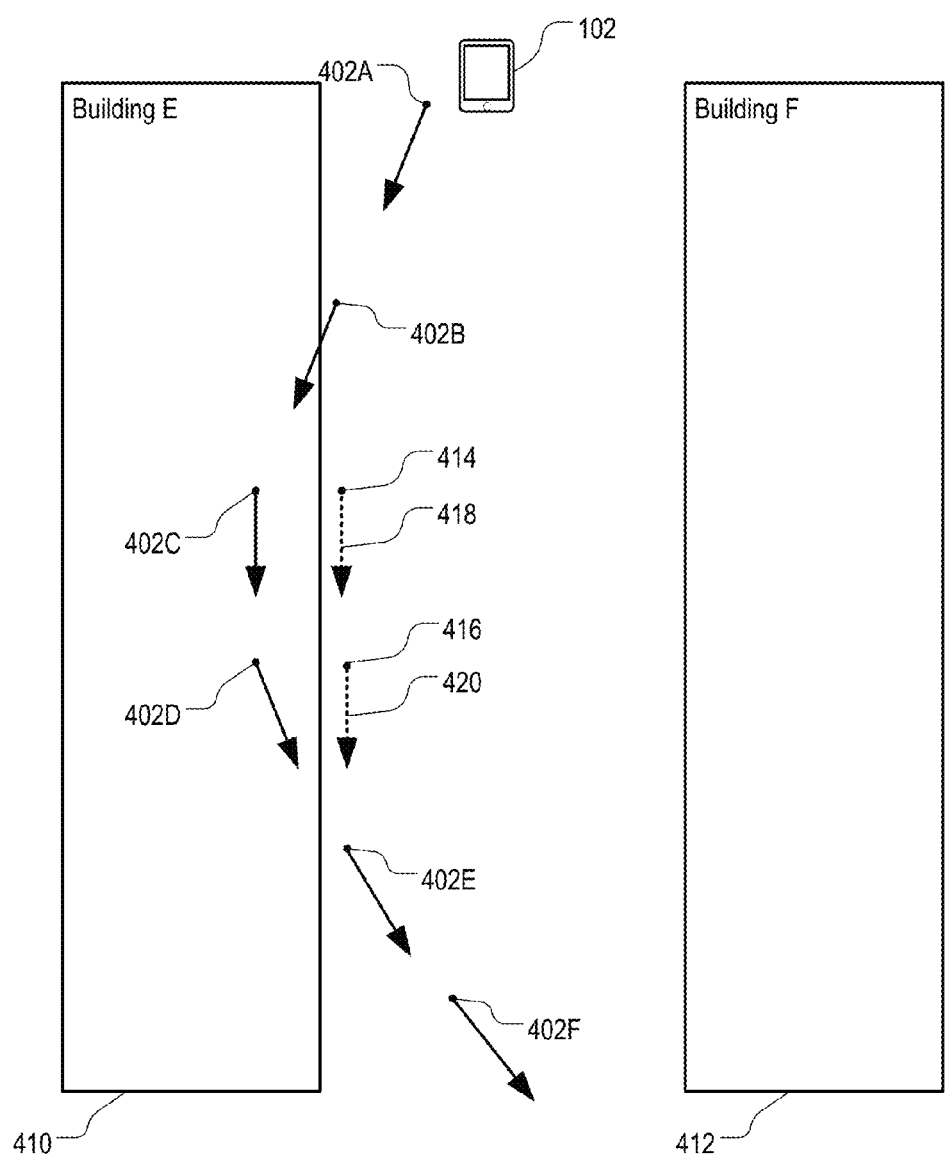
FIG. 4 is a diagram illustrating example techniques of correcting estimated position and velocity using 3D building models.

FIG. 4 is a diagram illustrating example techniques of correcting estimated position and velocity using 3D building models. A GNSS receiver of mobile device 102 can determine that mobile device 102 at a velocity that has a magnitude and a direction. Mobile device 102 can determine, based on the magnitude, that likelihood that mobile device is carried by a pedestrian is lower than a threshold value. Accordingly, mobile device 102 can determine that mobile device 102 is unlikely to enter a building. Based on the direction, mobile device 102 can determine mobile device 102 moves along path defined by locations 402A, 402B, 402C, 402D, 402E and 402F. Each of locations 402A through 402F is an estimated position of mobile device 102 at a particular time. In FIG. 4, each of locations 402A through 402F is associated with an arrow having a length corresponding to a magnitude of the velocity at a corresponding estimated position. Each arrow has a direction corresponding to a direction of movement of mobile device 102 at each respective estimated position.

Mobile device 102 can determine, using a 3D building model, that buildings 410 and 412 are located within a threshold distance of mobile device 102 to interfere with GNSS signal reception. In addition, mobile device 102 can determine that the path of mobile device 102 intersects building 410. Accordingly, mobile device 102 can modify the path. Modifying the path can include moving estimated positions 402C and 402D to new locations 414 and 416. Mobile device 102 can determine locations 414 and 416 out of building 410 using various factors. For example, mobile device 102 can select locations 414 and 416 that minimally impact the validity of magnitudes and directions of the velocity of mobile device 102 measured earlier. Mobile device can associate new velocities 418 and 420 to mobile device 102. The new velocity may have direction adjusted based on shape of building 410 as defined in the 3D building model. Mobile device 102 can then present a new path for display. The new path can be defined by locations 402A, 402B, 414, 416, 402E and 402F.

Figure 5A:
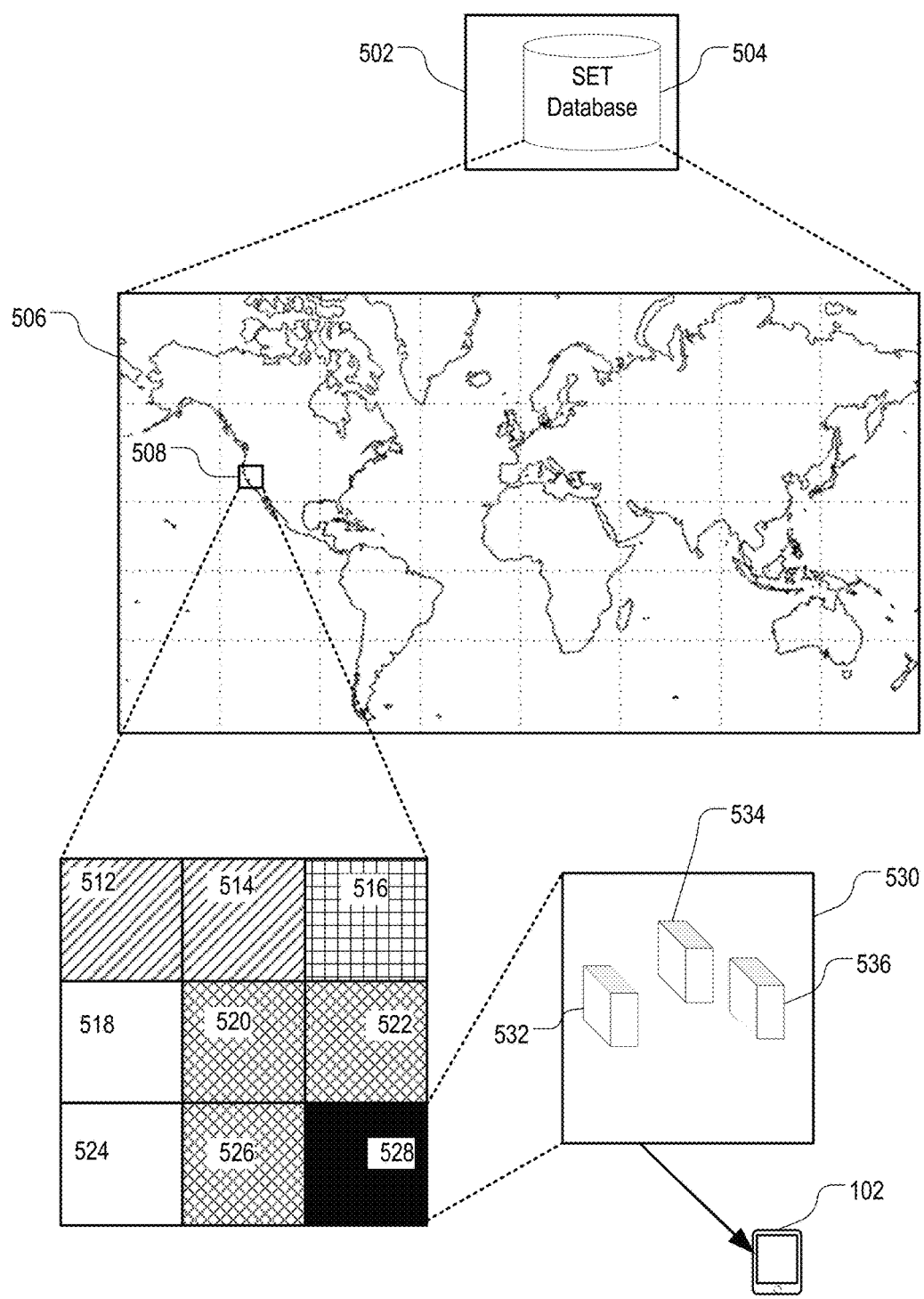
FIG. 5A is a diagram illustrating example techniques of determining signal environment tiles and tile categories for positioning.

FIG. 5A is a diagram illustrating example techniques of determining signal environment tiles and categories for positioning. Mobile device 102 can fetch geographic feature data including 3D building models on an as-needed basis from location server 502. Location server 502 can include one or more computers configured to receive request from, and provide data to, mobile device 102 through a communications network (e.g., the Internet).

Location server 502 can include signal environment tile database 504. Signal environment tile database can store geographic feature data including information on geographic features in geographic area 506 (e.g., the world). Location server 502 can organize the information as signal environment tiles. Each signal environment tile can correspond to a patch of geographic region defined by latitude and longitude coordinates.

For example, location server 502 can represent a portion 508 of geographic area 506 as signal environment tiles 512, 514, 516, 518, 520, 522, 524, 526 and 528. Each of the tiles can be an M-by-N degree (e.g., 0.05 degrees latitude by 0.05 degrees longitude) geometric shape approximating a rectangle (not drawn to scale). Each geometric shape can cover a respective geographic region.

Each of the tiles can be associated with a tile category corresponding a type of signal reflection that may affect GNSS reception. For example, signal environment tiles 518 and 524 can be associated with a first tile category (e.g., "open water") indicating that reflection of GNSS signals will most likely be caused by bodies of water in the corresponding regions. Signal environment tiles 512 and 514 can be associated with a second category (e.g., "rural") indicating that reflection of GNSS signals will most likely be caused by ground and isolated buildings in the corresponding regions. Signal environment tile 516 can be associated with a third category (e.g., "simple urban") indicating that reflection of GNSS signals will most likely be caused by sparsely distributed buildings in the corresponding region. Signal environment tiles 520, 522 and 528 can be associated with a fourth category (e.g., "dense urban") indicating that reflection of GNSS signals will most likely be caused by connected or densely distributed buildings in the corresponding regions. Signal environment tile 528 can be associated with a fifth category (e.g., "urban canyon") indicating that reflection of GNSS signals will most likely be caused by multiple tall buildings having mirror-like surfaces in the corresponding region.

Each signal environment tile may include one or more 3D building models that include information on geographic features located in the tile. For example, signal environment tile 528 may include locations, footprints, and heights of buildings, billboards, bridges and other structures in a corresponding geographic region.

Mobile device 102, upon determining an initial estimated position, can submit that estimated position to location server 502. In response, location server 502 can provide to mobile device 102 one or more signal environment tiles that cover that estimated position or are closest to that estimated position. Each signal environment tile can be associated with a tile category. Mobile device 102 can determine, based on the tile category, whether to proceed to download the 3D building models in the signal environment tile.

For example, mobile device 102 can submit an estimated position and receives signal environment tile 528 enclosing the estimated position. Signal environment tile 528 has a particular tile category (e.g., "urban canyon") that has a value indicating that 3D building models can improve positioning performance. Based on the indication, mobile device 102 can submit a request to location server 502. Location server 502 then provides 3D building model 530 for download. 3D building model 530 can include information on structures 532, 534 and 536 that are located in proximity to the estimated position. Mobile device 102 can then determine which of structures 532, 534 or 536 may block or reflect a signal from a GNSS satellite given a position of the GNSS satellite and an estimated position of mobile device 102. The knowledge on which satellite signal is blocked or reflect can help determine a lower bound of uncertainty in position estimation.

In addition, mobile device 102 can provide the variance corresponding to the particular signal environment tile to a GNSS receiver for location estimation and correction. Mobile device 102 can provide the variance through an application programming interface (API). For example, the API may specify that the GNSS receiver can receive the variances from mobile device 102, or that the GNSS receiver can receive an enumerated type (enum) data item (e.g., 0, 1, 2, 3 . . . ) where each value in the data item corresponds to a respective category (e.g., 0 for "open water" and 4 for "urban canyon"). Using the enum data item, the GNSS receiver can perform a lookup in a firmware storage device to determine pre-loaded variances. The GNSS can pre-load or change the variances during a firmware update.

Figure 5B:
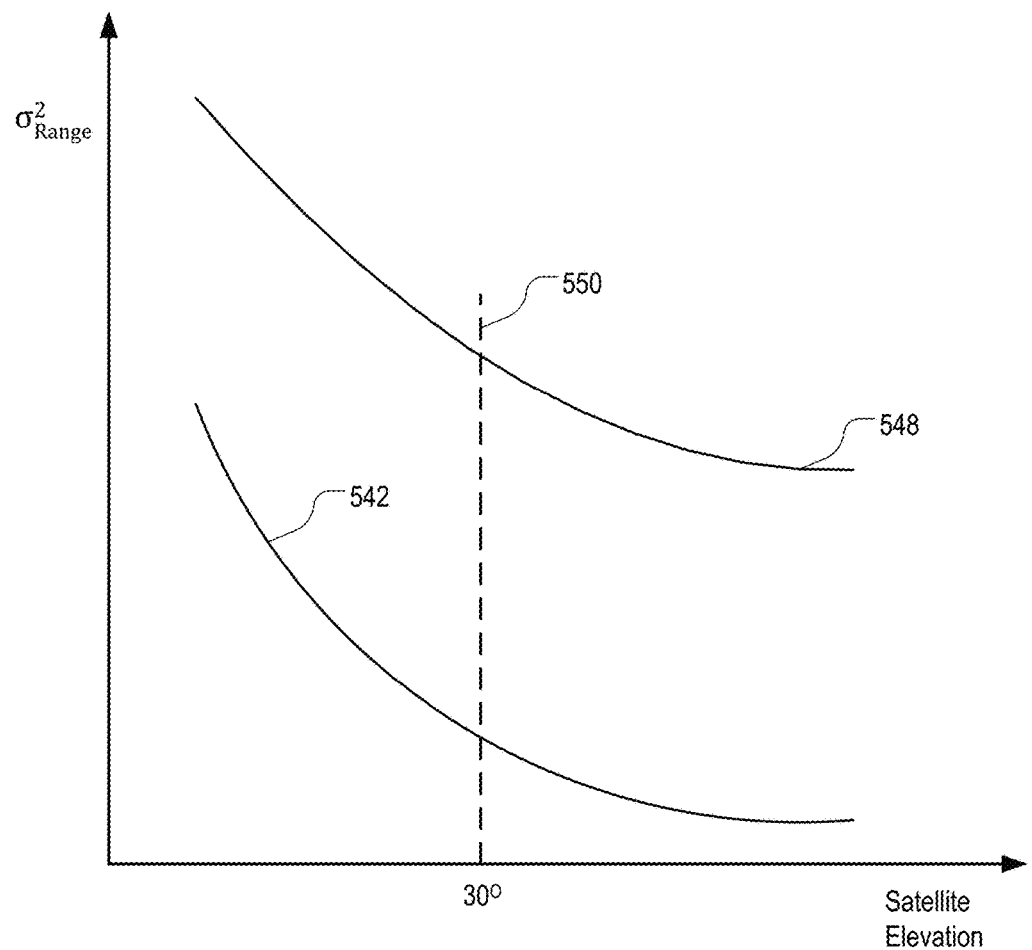
FIG. 5B is a diagram illustrating example tile categories.

FIG. 5B is a diagram illustrating example tile categories. Each signal environment tile may be associated with a respective relationship between pseudorange variance and satellite position that is specific to the category of that tile. The variance can correspond to empirically determined location error margin in the region corresponding to that tile. The tile category of a signal environment tile can indicate that relationship.

For example, signal environment tile 512 (of FIG. 5A) can correspond to a tile category "rural" indicating relationship 542. As shown in FIG. 5B, in a signal environment for "rural" tile category, pseudorange uncertainty (as measured by variance $\sigma_{Range}^2$) decreases as satellite elevation (as measured by degrees from horizon) increases. The rate of decrease is at a first level.

A tile category that corresponds to more reflecting and blocking features can be associated with a higher uncertainty. For example, signal environment tile 528 (of FIG. 5A) can correspond to a tile category "urban canyon" indicating relationship 548. As shown in FIG. 5B, in a signal environment for "urban canyon" tile category, pseudorange uncertainty (as measured by variance $\sigma_{Range}^2$) decreases as satellite elevation (as measured by degrees from horizon) increases. The rate of decrease is at a second level that is slower than the first level. In addition, at same satellite elevation 550, the uncertainty associated with signal environment tile 528 is higher. Accordingly, location server 502 or mobile device 102 can determine that if an estimated position corresponds to signal environment tile 512 having tile category "rural" (or another representative value), additional download of 3D building models is unnecessary. In contrast, location server 502 or mobile device 102 can determine that if an estimated position corresponds to signal environment tile 528 having tile category "urban canyon" (or another representative value), additional download of 3D building models is beneficial.

Figure 6A:
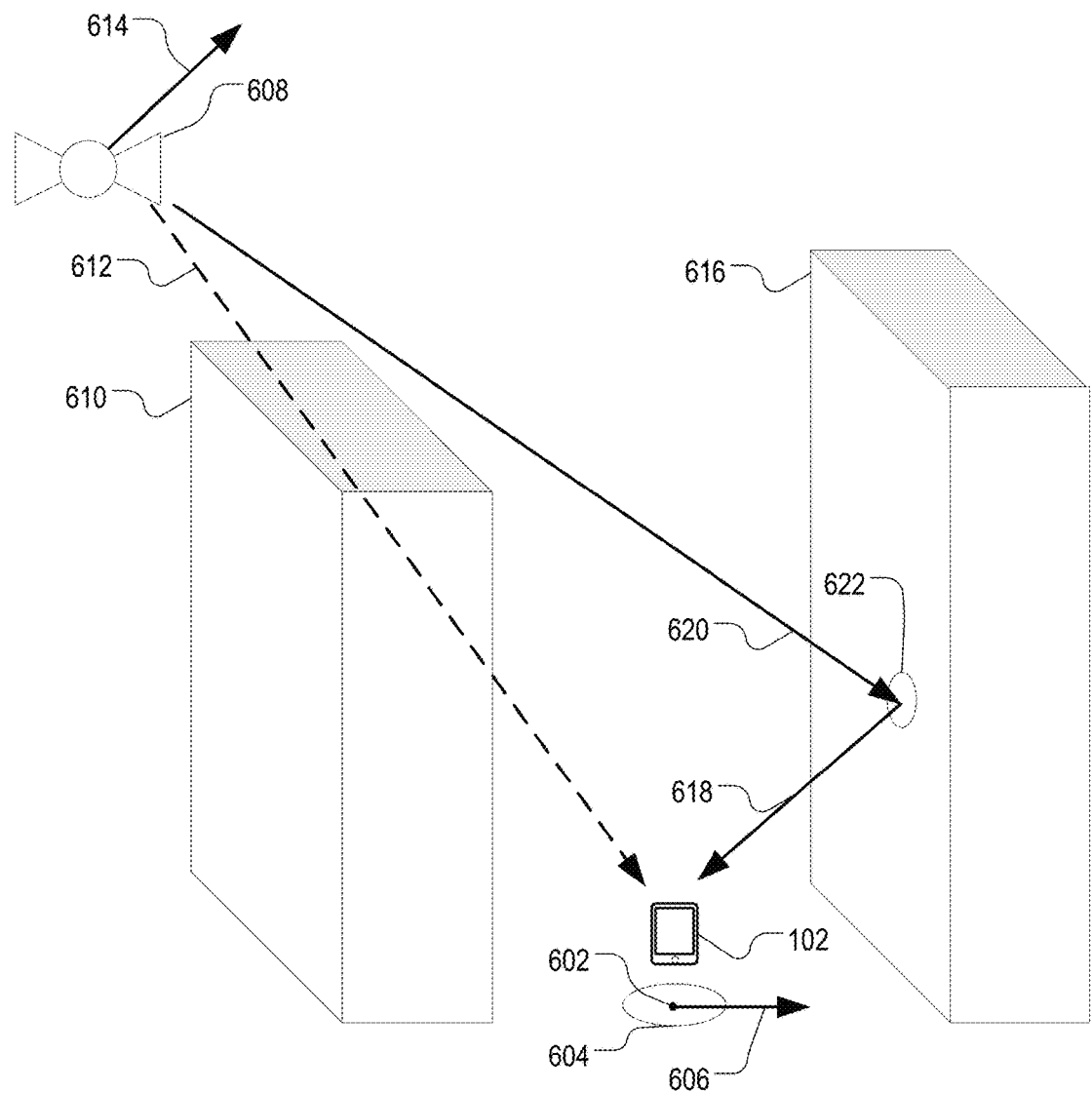
FIG. 6A is a diagram illustrating example techniques of providing Doppler correction using 3D building models.

FIG. 6A is a diagram illustrating example techniques of providing Doppler correction using 3D building models. Mobile device 102 can estimate and correct effects of multipath interferences on measured pseudoranges and pseudorange rates using 3D building models coupled with estimated position and estimated velocity. Estimating expected Doppler shift on a GNSS signal based on the estimated position and velocity and based on surrounding building geometry can aid acquisition and improve time to first fix (TTFF) and power cost.

At a given time, mobile device 102 may be located at estimated position 602 having estimated uncertainty 604. Mobile device 102 may have an estimated velocity 606. Estimated velocity 606 has a direction that points away from satellite 608 of a GNSS system. Structure 616, located between mobile device 102 and satellite 608, blocks direct LOS signal path 612 between estimated position 602 and satellite 608. Since direction of velocity 606 points away from satellite 608, the true relative velocity is difference between a projection of satellite velocity 614 and a projection of velocity 606 along vector of LOS signal path 612.

In the example shown, mobile device 102 receives reflected signal from a mirror-like surface of structure 616. Accordingly, the measured Doppler drift is erroneous. In particular, measured relative velocity is increased by velocity 606 along a reflection vector of segment 618 of a signal path. Likewise, measured pseudo-range suffers in the direction of the reflection vector.

Mobile device 102 can estimate the errors caused by structures 610 and 616 based on estimated velocity 606, satellite velocity 614, and geometry of structures 610 and 616 surrounding mobile device 102. Estimating of pseudorange error can be based at least in part on estimated position 602. The measured Doppler effect can be based at least in part on estimated velocity 606. In pure NLOS scenarios as shown in FIG. 6A, error caused by the sense of relative motion between satellite 608 and mobile device 102 can double. Accordingly, mobile device 102 can inverse relative sense of motion of mobile device 102 and motion of satellite 608. The inversion can provide correction to measured pseudorange rate. Mobile device 102 can then couple the correction in a velocity estimate to position estimate via a system model in a statistical filter (e.g., a Kalman filter).

Mobile device 102 can create a sampling grid around estimated position 602 and designate multiple candidate locations based on position error distribution. The position error distribution can be based on estimated uncertainty 604, or based on a lower bound of uncertainty in position estimation as determined using a 3D building model representing structures 610 and 616.

Mobile device 102 can determine, based on constellation of GNSS satellites and a 3D building model, which satellites are partially or entirely blocked. Mobile device can determine corresponding uncertainties for each respective satellite that is blocked. Mobile device 102 can determine a probable path signal for signals from a visible satellite to mobile device 102. In the example shown, the probably signal path include segments 618 and 620.

Mobile device 102 can computed estimated Doppler corrections and uncertainty from the probable signal path. Mobile device 102 can determine the Doppler correction based on component of velocity 606 projected on a probably LOS vector. In the example shown, the projected LOS vector is a vector of path segment 620. Mobile device 102 can determine reflections on the probable path, e.g., specular reflection 622. Mobile device 102 can inverse a sense for the Doppler correction for each reflection. Accordingly, after the correction, mobile device 102 can determine a pseudorange rate based on knowledge that, although Doppler shift as measured by a GNSS receiver indicates that mobile device 102 is moving towards satellite 608, the reflection results in the Doppler shift indicates that mobile device 102 is moving away from satellite 608.

Mobile device 102 can compute estimated pseudorange correction and associated uncertainty based on the Doppler correction. Mobile device 102 can augment innovations of a Kalman filter and associated uncertainties using the Doppler corrections, reorder innovations based on updated uncertainties for a Chi-square test, and check and process corrected innovations. Checking and processing corrected innovations can include discarding and preserving pseudoranges and pseudorange rates after taking into consideration Doppler shifts caused by the reflections. In some implementations, mobile device 102 can provide the Doppler correction to a GNSS receiver through an API specifying formation and parameters for communication. The GNSS receiver can be programmed to perform some or all of the tasks, including computing pseudorange corrections and subsequent tasks.

By taking into account effects on Doppler shift caused by specular reflection 622, mobile device 102 can distinguish measured Doppler effect uncertainty caused by clock drift and measured Doppler uncertainty caused by mis-estimation of relative motion between mobile device 102 and satellite 608. The distinction maybe otherwise undetectable. By distinguishing measured Doppler effect caused by clock drift and effect caused by specular reflection 622, mobile device 102 can improve performance in position estimation. For example, in a Chi-square test, mobile device 102 may preserve residuals of a Kalman filter that would otherwise be rejected for being low quality, upon determining that the fault in the residuals are caused by reflection 622 rather than by other random factors, and upon correcting the Doppler shift accordingly. Fewer rejections can result in reduced positioning uncertainty. Fewer rejections can also lead to greater tolerance to clock drift.

Figure 6B:
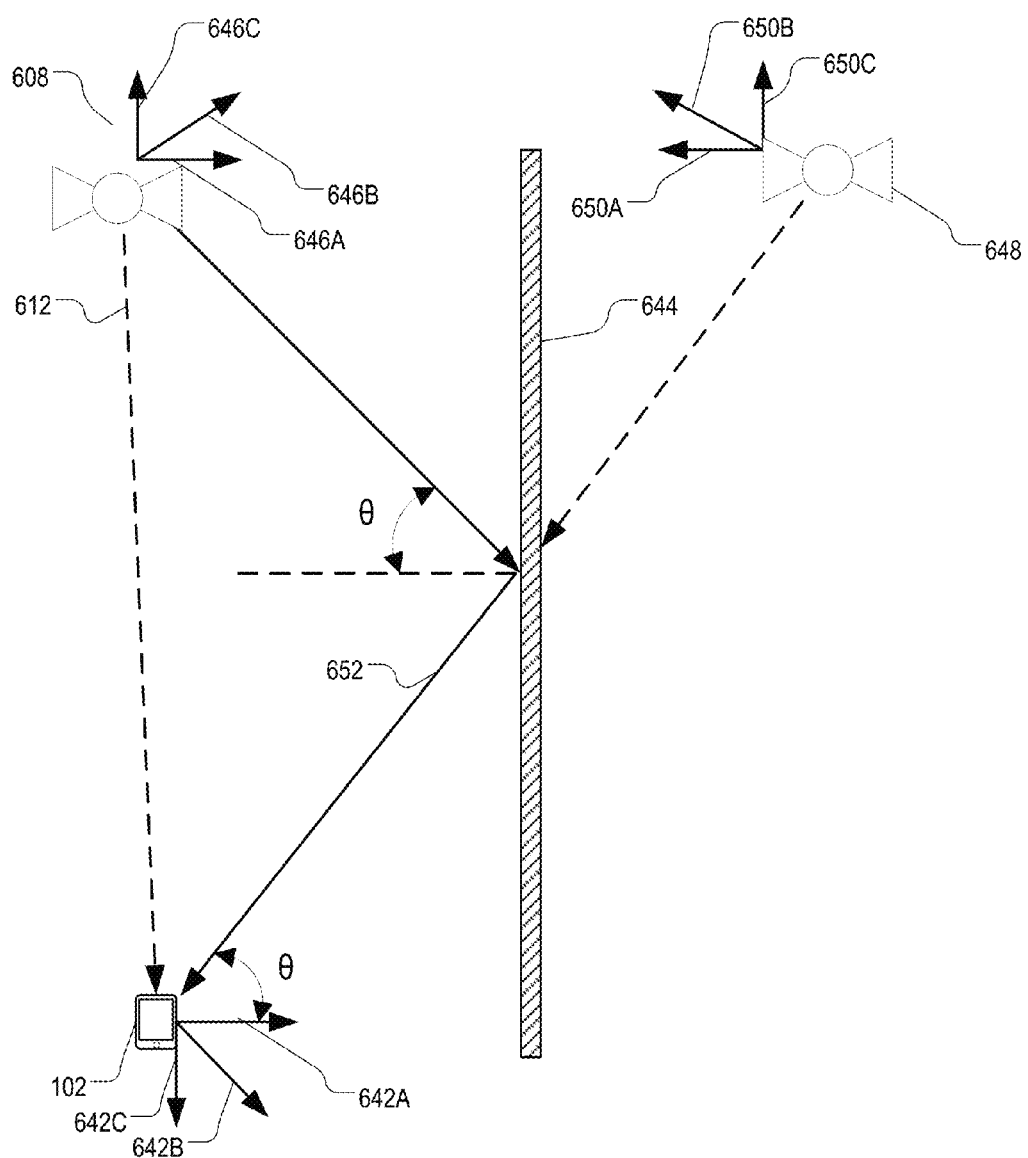
FIG. 6B is a diagram illustrating example techniques of Doppler correction calculation.

FIG. 6B is a diagram illustrating example techniques of Doppler correction calculation. Mobile device 102 can travel at a user velocity $\bar{u}$. User velocity $\bar{u}$ can be a vector having components 642A, 642B and 642C in a geographic coordinate system, e.g., an east, north, up (ENU) coordinate system. Mobile device 102 can move toward reflective surface 644, e.g., a reflective surface of structure 616.

Satellite 608 providing a GNSS signal may move at satellite velocity $\bar{v}_s$ in the geographic coordinate system. Satellite velocity $\bar{v}_s$ can have components 646A, 646B and 646C in the geographic coordinate system. Due to reflection from reflective surface 644, as measured by mobile device 102, satellite 608 may appear at location 648, which has an apparent elevation of a Satellite 608 can have measured satellite velocity $\bar{v}_s$, having components 650A, 650B and 650C in the geographic coordinate system.

Mobile device 102 can determine the Doppler correction using calculations as described below. Mobile device 102 can Doppler shift as follows, using equation (8).

$$\frac{\Delta f}{f} = \frac{v_R}{c}, \quad (8)$$

where $\Delta f$ is the Doppler shift, f is the baseline frequency for the GNSS signal (e.g., 1575.42 MHz), $v_R$ is a relative velocity between satellite 608 and mobile device 102, and c is the speed of light.

Mobile device 102 can determine components of user velocity $\bar{u}$ and measured satellite velocity $\bar{v}_{sR}$ as follows, using equations (9) and (10), respectively.

$$\bar{u}_R = (\bar{u} \cdot \bar{n}_{uR})\bar{n}_{uR}, \quad (9)$$

where $\bar{u}_R$ is the component of the user velocity $\bar{u}$ on reflected signal path 652, $\bar{n}_{uR}$ is a unit vector along reflected signal path 652.

$$\bar{v}_{sR} = (\bar{v}_{s'} \cdot \bar{n}_{sR})\bar{n}_{sR}, \quad (10)$$

where $\bar{v}_{s'}$ is the reflected velocity of satellite 608 with respect to reflective surface 644, $\bar{v}_{sR}$ is the component of $\bar{v}_{s'}$ along the reflected path from SV to user, $\bar{n}_{sR}$ is a unit vector along reflected signal path 652.

Mobile device 102 can determine that measured satellite velocity $\bar{v}_s$, can change senses for each reflection, as described in equation (11) below.

$$\bar{v}_{s'} = \bar{v}_s - 2(\bar{v}_s \cdot \bar{n}_B)\bar{n}_B, \quad (11)$$

where $\bar{v}_s$ is the satellite velocity, $\bar{n}_B$ is unit normal vector perpendicular to reflective surface 644.

Accordingly, a component of velocity perpendicular to reflective surface 644 is inverted due to the reflections. Accordingly, mobile device 102 can determine the $v_R$ of equation (8) as follows, using equation (12).

$$v_R = \bar{v}_{s'} \cdot \bar{n}_{sR} - \bar{u} \cdot \bar{n}_{uR} \quad (12)$$
$$= [\bar{v}_s - 2(\bar{v}_s \cdot \bar{n}_B)\bar{n}_B] \cdot \bar{n}_{sR} - \bar{u} \cdot \bar{n}_{uR}$$

Accordingly, mobile device 102 can determine that measured Doppler shift satisfies the following.

$$\Delta f_{measured} = \frac{v_R}{c} f \quad (13)$$
$$= \frac{f}{c}\{[\bar{v}_s - 2(\bar{v}_s \cdot \bar{n}_B)\bar{n}_B] \cdot \bar{n}_{sR} - \bar{u} \cdot \bar{n}_{uR},$$

where $\Delta f_{measured}$ is measured Doppler shift. Accordingly, mobile device 102 can determine the Doppler correction based on the relative velocity of satellite 608 and mobile device 102 along reflected path 652.

The number of reflections is a factor, and may not be the sole determinant in the correction. For example, with an odd number of reflections, the Doppler shift is the opposite of the direct LOS Doppler shift, whereas and even number of reflections can make the sense of the shift the same as the LOS case. Mobile device 102 can determine the correction based on relative difference between the user velocity component along reflected signal path 652 and the satellite velocity component along the reflected path.

In contrast, expected Doppler shift in the absence of reflections can be expressed below in equation (14).

$$\Delta f_{expected} = \frac{f}{c}(\bar{v}_s - \bar{u}) \cdot \bar{n}_{uS}, \quad (14)$$

where $\Delta f_{expected}$ is the expected Doppler shift in the absence of reflections, $n_{uS}$ is a unit vector on direct LOS 612. Mobile device 102 can determine a Doppler correction according to a difference between the expected Doppler shift in the absence of reflections and the measured Doppler shift, using equation (15) below.

$$k = \frac{f}{c}[(\bar{v}_s - \bar{u}) \cdot \bar{n}_{uS} - (\bar{v}_{s'} \cdot \bar{n}_{sR} + (-1)^n \bar{u} \cdot \bar{n}_{uR})], \quad (15)$$

where k is the Doppler correction. For clarity, the correction is described in reference to a generic satellite, satellite 608. For a GNSS constellation having multiple satellites, mobile device 102 can determine a respective Doppler correction for each of the satellites.

Figure 7A:
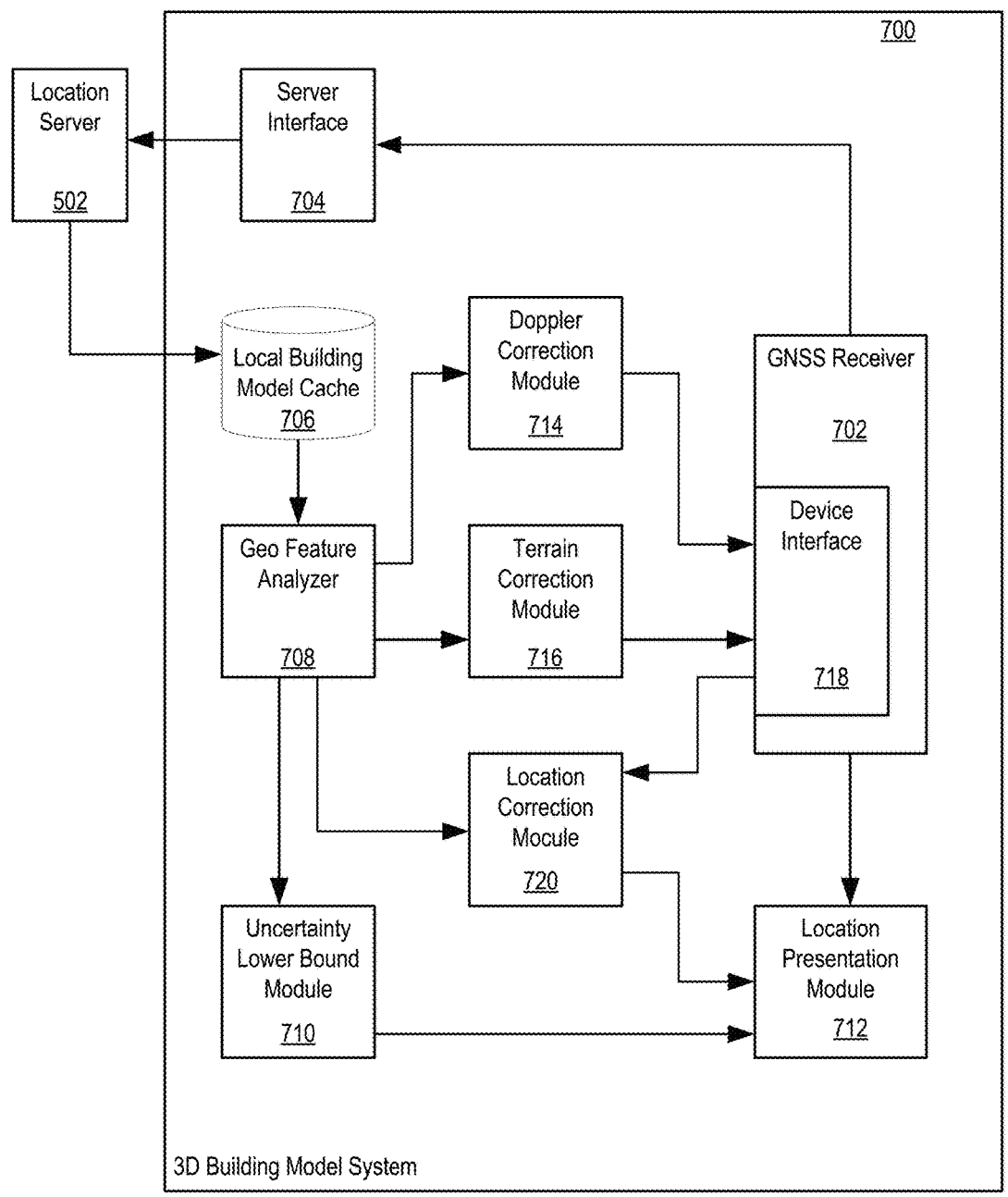
FIG. 7A is a block diagram illustrating components of an example system configured to perform the operations of GNSS positioning using 3D building models.

FIG. 7A is a block diagram illustrating components of example system 700 configured to perform the operations of GNSS positioning using 3D building models. System 700 can be implemented on a mobile device, e.g., mobile device 102. System 700 can include one or more computer processors programmed to perform operations of location determination using 3D building models.

System 700 can include, or be coupled to, GNSS receiver 702. GNSS receiver 702 can include an antenna and a global positioning system (GPS) processor configured to determine one or more estimated PVT values from satellite signals. Each of the estimated position, velocity and time may be associated with a respective uncertainty value. GNSS receiver 702 can provide the estimated PVT, as well as the associated uncertainty values, to server interface 704.

Server interface 704 is a component of system 700 configured to receive estimated PVT from GNSS receiver 702 and request one or more tiles of 3D building models. Server interface 704 can submit the request to location server 502 as described above in reference to FIG. 5. The request can include the estimated position, velocity, time or any combination of the above.

Upon receiving the one or more tiles of 3D building models from location server 502, system 700 can store the received tiles in local building model cache 706. System 700 can update local building model cache 706 upon entering or predicted to be entering a new geographic region.

System 700 can include feature analyzer 708. Feature analyzer 708 is a component of system 700 configured to determine number of geographic features that may affect GNSS signal reflection, heights of these geographic features, geometry of these features, location and geometry of mirror-like surfaces, number of satellites visible by GNSS receiver 702, and other factors that geographic features may affect location determination. Feature analyzer 708 can make the determination using the tiles stored in local building model cache 706 and the PVT values and associated uncertainties provided by GNSS receiver 702.

System 700 can include uncertainty lower bound module 710. Uncertainty lower bound module 710 is a component of system 700 configured to determine a lower bound of uncertainty based on output from feature analyzer 708. Uncertainty lower bound module 710 can determine the lower bound in various ways, including, for example, based on a feature count threshold value and a feature height threshold value or based on a number of visible satellites and a weight matrix. Uncertainty lower bound module 710 can provide the lower bound of uncertainty to location presentation module 712.

Location presentation module 712 is a component of system 700 configured to present an estimated position and associated uncertainty on a user interface. The user interface can be a virtual map displayed on mobile device 102, audio or visual turn-by-turn navigation instructions, or any combination of the above. In some implementations, Location presentation module 712 can provide the estimated position and associated uncertainty to a computer program (e.g., a program that provides location-based services) as inputs. Location presentation module 712 can obtain the estimated position from GNSS receiver 702. Location presentation module 712 can designate the lower bound of uncertainty received from uncertainty lower bound module 710 as the uncertainty associated with the estimated position.

System 700 can include Doppler correction module 714. Doppler correction module 714 is a component of system 700 configured to receive output including counts, locations, shapes and sizes of mirror-like surfaces around an estimated position. Doppler correction module 714 can then determine the Doppler corrections based on the output, as described above in reference to FIGS. 6A and 6B. Doppler correction module 714 can provide the Doppler corrections to GNSS receiver 702 for further processing, e.g., for correcting pseudorange and pseudorange rate calculations.

System 700 can include Doppler correction module 714. Doppler correction module 714 is a component of system 700 configured to receive output including counts, locations, shapes and sizes of mirror-like surfaces around an estimated position. Doppler correction module 714 can then determine the Doppler corrections based on the output, as described above in reference to FIGS. 6A and 6B. Doppler correction module 714 can provide the Doppler corrections to GNSS receiver 702 for further processing, e.g., for correcting pseudorange and pseudorange rate calculations.

System 700 can include terrain correction module 716. Terrain correction module 716 is a component of system 700 configured to determine various parameters to correct based on output of feature analyzer 708. For example, variance of a pseudorange ($\sigma_{range}^2$) can be a function for satellite elevation, where a higher satellite elevation correspond to a lower variance. The rate of decrease of variance corresponding to increase in elevation can be different for different terrains. Each particular terrain category can correspond to a different curve for the decrease. Terrain correction module 716 can determine a respective function for each terrain category, and provide a specific function to GNSS receiver for determining the uncertainty of pseudoranges, pseudorange rates, or uncertainty in a PVT solution.

GNSS receiver 702 can include device interface 718. Device interface 718 is a component of GNSS receiver 702 configured to receive input from Doppler correction module 714 and terrain correction module 716 according an API specifying parameters and formats. For example, the API can include a specification indicating that GNSS receiver 702 can receive an enumerated type value, where each value can indicate a particular relationship between pseudorange uncertainty and satellite elevation. Upon receiving a value, GNSS receiver 702 can use the corresponding relationship in estimating pseudorange uncertainty.

System 700 can include location correction module 720. Location correction module 720 is a component of system 700 configured to receive estimated PVT values, associated uncertainty from GNSS receiver 702, and receive output from feature analyzer 708 Location correction module 720 can then determine position, velocity, and uncertainty corrections on output from GNSS receiver 702 based on geographic features. The correction can include moving the estimated position, changing a direction of the velocity, and increasing or decreasing the uncertainty. Location correction module 720 can provide corrected PVT values and uncertainty to location presentation module 712.

Figure 7B:
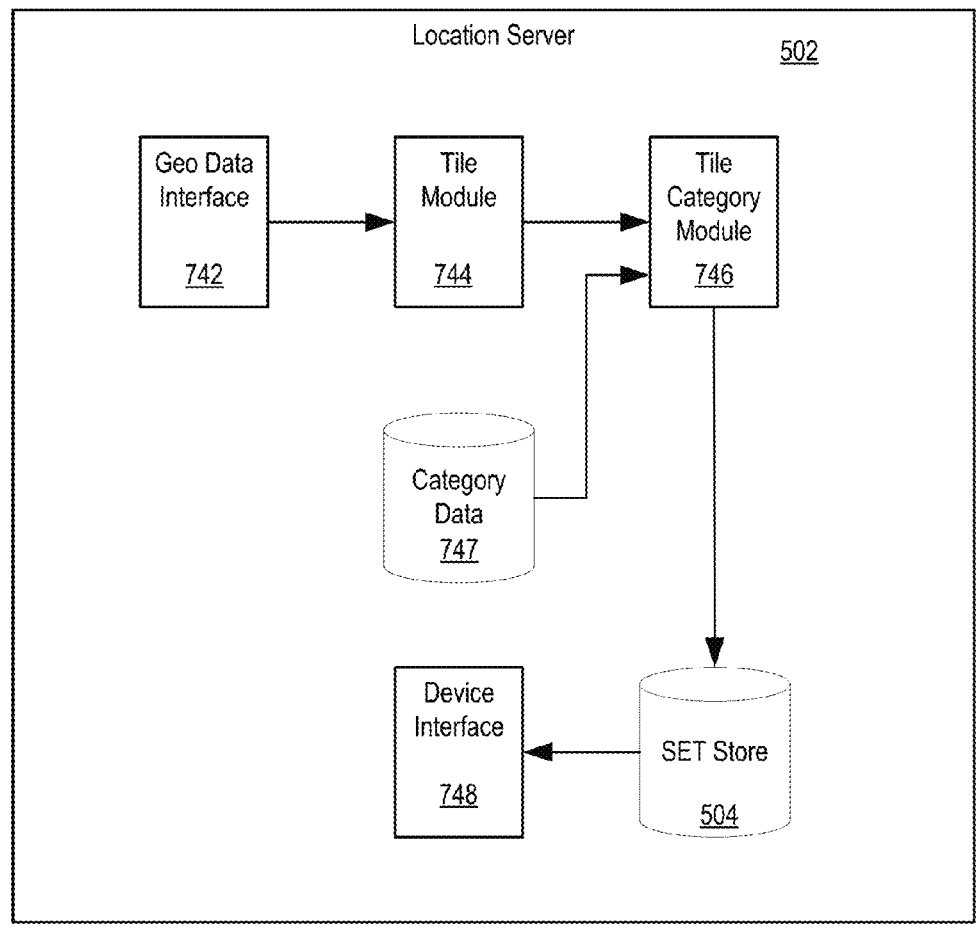
FIG. 7B is a block diagram illustrating components of an example location server providing geographic feature data.

FIG. 7B is a block diagram illustrating components of example location server 502 providing geographic data. Location server 502 can include one or more processors programmed to perform various operations.

Location server 502 can include geographic data interface 742. Geographic data interface 742 is a component of location server 502 configured to receive geographic data from various sources. The data can include Wi-Fi™ access point data, survey data, satellite images, 3D building models etc. In some implementation, geographic data interface 742 can determine the 3D building models from data supplied by various computer systems in various formats.

Geographic data interface 742 can provide the geographic data to tile module 744. Tile module 744 is a component of location server 502 configured to group the geographic data to signal environment tiles based on location. Each tile can include a geometric shape (e.g., a rectangle) that encloses a set of features. Tile module 744 can provide the signal environment tiles to tile category module 746.

Tile category module 746 is a component of location server 502 configured to compare information on geographic features in each signal environment tile with category data to determine a tile category for each signal environment tile. The category data can include empirical data derived from surveys on how geographic features of various terrains of each tile category affect GNSS signal reception. The category data can include data derived from models of signal propagation in the various terrains of each tile category. Location server 502 can store category data in category database 747.

Tile category module 746 can associate a tile category that matches best with geographic data of a signal environment tile with that tile. Tile category module 746 can store the signal environment tiles and associated tile categories in signal environment tile database 504. Location server 502 can include device interface 748. Device interface 748 is a component of location server 502 configured to receive a request from a mobile device, e.g., mobile device 102. The request can include an estimated position. Device interface 748 can provide a tile type associated of a tile enclosing the estimated position as a response to the request. If the estimated position is associated with an uncertainty, the estimated position can have an error margin and associated with an area that may span multiple signal environment tiles. Device interface 748 can provide tile types of all signal environment tiles intersecting the estimated position as a response.

The request can include an indicator indicating that 3D building models are requested for an estimated position. In response, device interface 748 can determine 3D building models of geographic features that surround the estimated position to the mobile device. Geographic features that surround the estimated position can be features that are in one or more signal environment tiles that enclose the estimated location.

Exemplary Procedures

Figure 8:
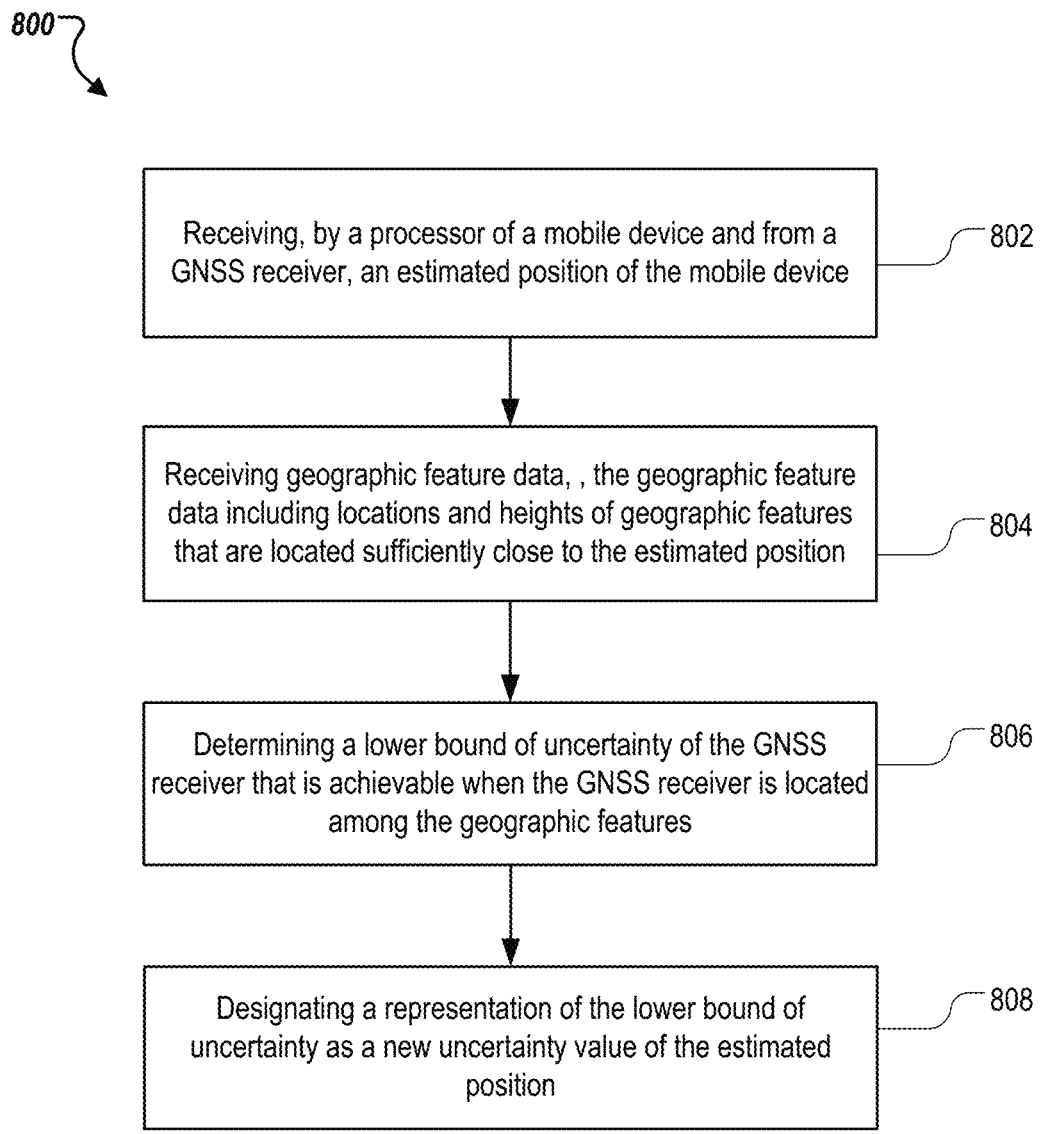
FIG. 8 is a flowchart of an example process of determining a lower bound of uncertainty of an estimated position using 3D building models.

FIG. 8 is a flowchart of example process 800 of determining a lower bound of uncertainty of an estimated position using 3D building models. Process 800 can be executed by a processor, e.g., a computer processor of mobile device 102.

The processor can receive (802) from a GNSS receiver an estimated position of the mobile device. The estimated position can include estimated geographic coordinates of latitude, longitude and altitude. The estimated position can be associated with an uncertainty value that corresponds to an error margin (e.g., in meters).

The processor can receive (804) geographic feature data, e.g., 3D building models. The geographic feature data can include locations, shapes and heights of geographic features that are located sufficiently close to the estimated position to interfere with signals received by the GNSS receiver. A 3D building model can include a model of any geographic feature that may interfere with signal reception, including natural and man-mad geographic features other than buildings.

Receiving the geographic feature data can include performing the following operations. The processor or a location server (e.g., location server 502 of FIG. 5) can determine a signal environment tile based on the estimated position. The signal environment tile can correspond to a geographic region. The geographic region being an area surrounding the estimated position of the mobile device. The signal environment tile can represent geographic features located in that geographic region that may interfere with GNSS signal reception. Based on a tile category of the signal environment tile, the processor or location server can determine that the geographic feature data of the signal environment tile can improve position estimate. The processor or the location server can submit to a signal environment tile database (e.g., signal environment tile database 504) the estimated position of the mobile device or an identifier of the signal environment tile. The signal environment tile database can store 3D models on geographic features including the 3D building model 530 of FIG. 5. The 3D models can be organized as signal environment tiles. The processor can receive the geographic feature data corresponding to the signal environment tile from the signal environment tile database.

The processor can determine (806) a lower bound of uncertainty of the estimated position that is achievable by the GNSS receiver when the GNSS receiver is located among the geographic features. The processor can make the determination based on at least one of the locations of the geographic features, a count of the geographic features, or the heights of the geographic features.

The processor can determine the lower bound when certain conditions are met. In some implementations, determining the lower bound of uncertainty can include determining whether the count of the geographic features located sufficiently close to the GNSS receiver to interfere reception of the GNSS signals satisfies a feature count threshold. The processor can determine whether an average of heights of the geographic features located sufficiently close to the GNSS receiver to interfere reception of the GNSS signals satisfies a feature height threshold. The processor can then determine the lower bound of uncertainty when both the feature count threshold and feature height are satisfied.

The processor can determine a value of the lower bound of uncertainty in various ways. In some implementations, determining the lower bound of uncertainty can be based on a predetermined factor and a width of an average road located in the geographic region enclosing the estimated position of the mobile device. For example, the lower bound can be two times the average road width in the region.

In some implementations, determining the lower bound of uncertainty can include determining satellites that visible by the GNSS receiver at the estimated position. The processor can determine a weight dilution of precision based on the visible satellites. The processor can then determine the lower bound of uncertainty based on the weight dilution of precision.

The processor can designate (808) a representation of the lower bound of uncertainty as a new uncertainty value of the estimated position. For example, the processor can increase the uncertainty value upon determining that the uncertainty value has smaller error margin than the lower bound of uncertainty. The processor can display a representation of the estimated position on a map displayed on a surface of the mobile device, for example, as a circle or marker. A size of the circle or marker can represent the lower bound of uncertainty.

In some implementations, the processor can determine a pseudorange tracking error matrix including elements indicating uncertainty values on various dimensions of pseudorange estimation. The processor can provide the pseudorange tracking error matrix as the pseudorange correction $\delta_{Terrain}$ to the GNSS receiver for estimating the position of the mobile device.

In some implementations, the processor can determine that the estimated geographic coordinates in the estimated position of the mobile device indicate a position inside of a geographic feature. In response, the processor can designate a set of geographic coordinates outside of the geographic feature as new estimated geographic coordinates of the estimated position, as described above in reference to FIGS. 3 and 4.

Figure 9:
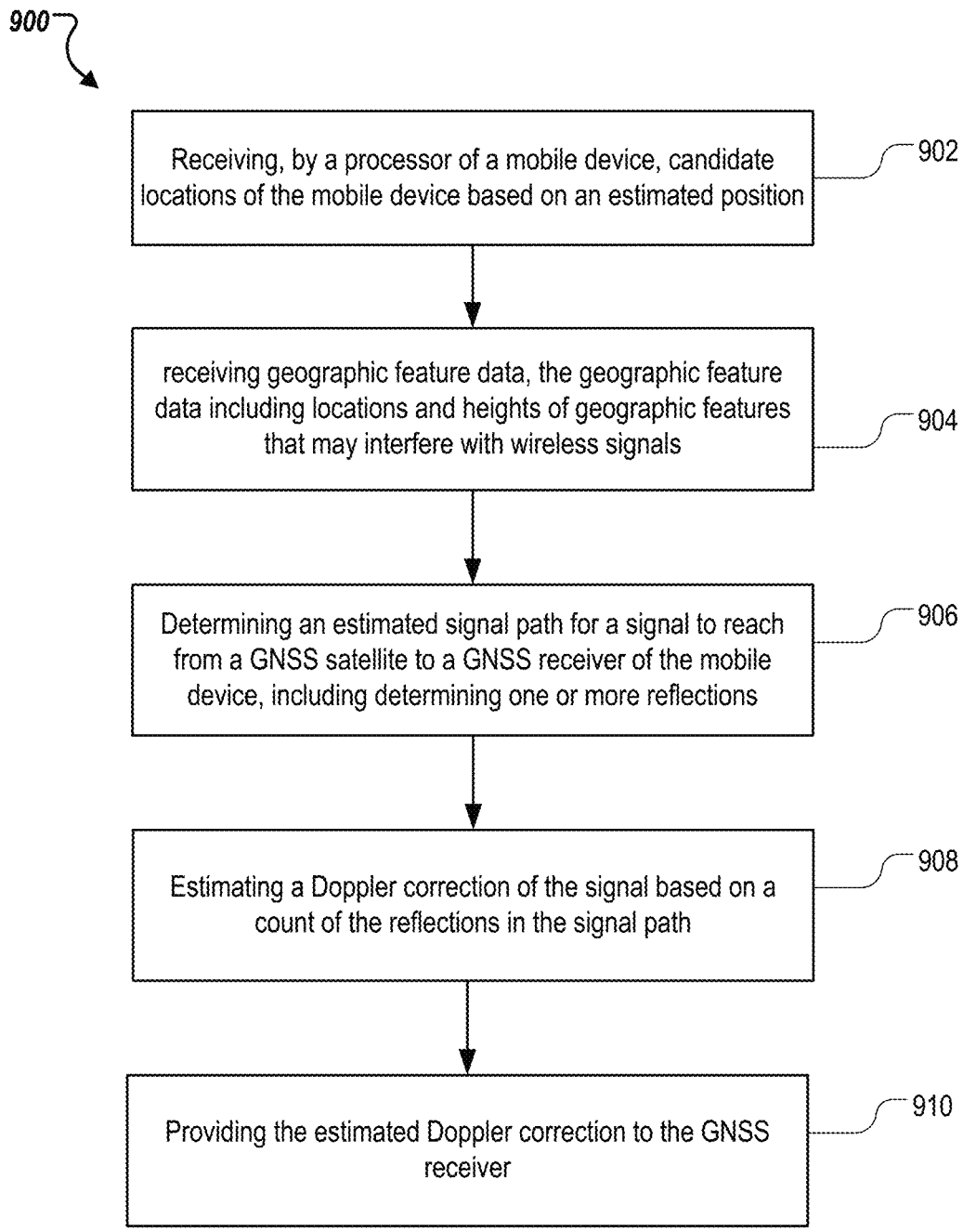
FIG. 9 is a flowchart of an example process of determining Doppler correction using 3D building models.

FIG. 9 is a flowchart of an example process of determining Doppler correction using 3D building models. Process 900 can be executed by a processor, e.g., a computer processor of mobile device 102.

The processor can determine (902) multiple candidate locations of the mobile device based on an estimated position provided by a GNSS receiver coupled to the mobile device. Determining the candidate locations can include determining a sampling grid around the estimated position and in an area defined by an uncertainty value associated with the estimated position. The processor can designate locations on the sampling grid as the candidate locations.

The processor can receive (904) geographic feature data. The geographic feature data, e.g., 3D building models, can include locations and heights of geographic features that are estimated to interfere with signals received by the GNSS receiver.

The processor can determine (906) an estimated signal path for a signal to reach from a satellite of the GNSS to the GNSS receiver. Determining the estimated signal path can include determining one or more reflections of the signal by the geographic features and determining an uncertainty value for the signal path based on the candidate locations. Determining the estimated signal path can include determining a probability value associated with the signal path based on the candidate locations. For example, in some implementations more candidate locations at which the GNSS receiver can receive the signal along the estimated signal path can correspond to a higher probability value for the path.

The processor can estimate (908) a Doppler correction of the signal based on a count of the reflections in the signal path. For each reflection, the processor can invert a sense of a vector of the Doppler correction. Estimating the Doppler correction can include estimating a component of user velocity projected along a segment of the estimated signal path. The segment can be the last segment of the signal path between a last reflection point and the GNSS receiver. In estimating the Doppler correction, the processor can estimate an uncertainty value associated with the Doppler correction based on various factors. For example, a higher $C/N_0$ value of a received signal can correspond to a lower uncertainty value.

The processor can provide (910) the estimated Doppler correction to the GNSS receiver for estimating at least one of a position of the mobile device or a velocity of the mobile device. In some implementations, the processor or the GNSS receiver can estimate a carrier Doppler shift between the satellite and the mobile device. The processor or the GNSS receiver can augment Kalman filter innovations and associated uncertainties using the Doppler correction. The processor or the GNSS receiver can order the Kalman filter innovations based on updated uncertainties. The processor or the GNSS receiver can feed the order innovations as input for a Chi-square test.

The processor or the GNSS receiver can perform the Chi-square test on the ordered innovations to reject those pseudorange or pseudorange rates. Accordingly, reflections and uncertainty of reflections, in addition to the conventional $C/N_0$ values and satellite elevations, can be bases for determining signal reliability by the Chi-square test. The additional bases can result in position and velocity estimation using more reliable pseudorange or pseudorange rate measurements. In some implementations, the processor can determine a receiver clock error based on the Doppler correction.

Figure 10:
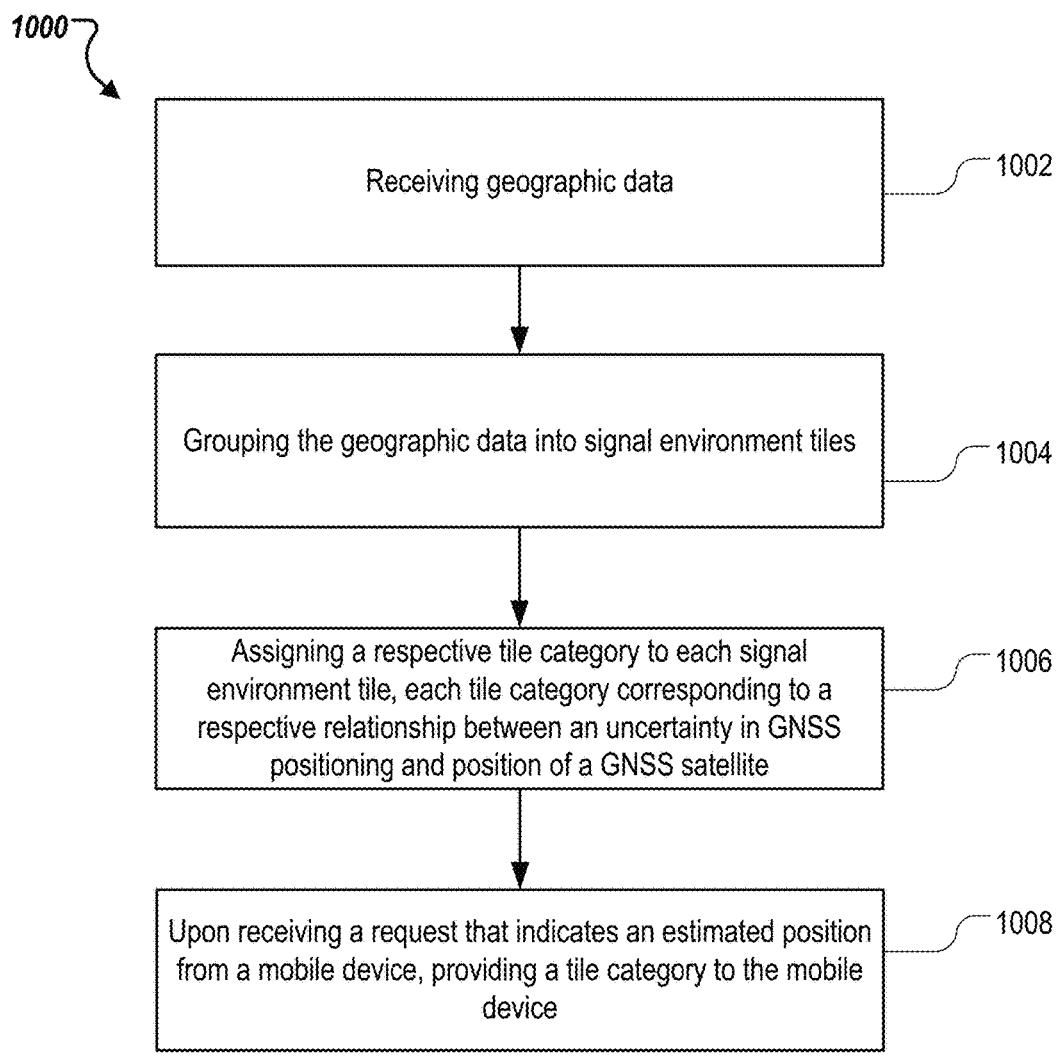
FIG. 10 is a flowchart of an example process of providing tiled geographic feature data to a mobile device.

FIG. 10 is a flowchart of example process 1000 of providing tiled geographic data to a mobile device. Process 1000 can be executed by a system including one or more processors. The system can include, for example, location server 502 of FIG. 5

The system can receive (1002) geographic information on geographic features in a geographic area. The geographic features can include structures that are estimated to interfere with reception of wireless signals at a location in the geographic area. The geographic information can be provided by one or more information sources, and include, for example, a wireless access point density in various regions of the geographic area, a digital surface model of the geographic area, a 3D building model of the geographic area, a geographic survey of the geographic area, a satellite image of the geographic area, or any combination of the above.

The system can group (1004) the geographic information into signal environment tiles of geographic feature data. Each signal environment tile can include a geometric shape occupying a respective geographic region in the geographic area. Each geometric shape can be a polygon represented by latitude and longitude coordinates, or a three-dimensional block represented by latitude, longitude and altitude coordinates.

The system can assign (1006) a respective tile category to each signal environment tile. Each tile category can correspond to a specified range of density and heights of geographic features. Each tile category can indicate a respective relationship between an uncertainty in GNSS positioning and a position of a satellite of the GNSS as viewed from a GNSS receiver located in the geographic region of the tile. The relationship can be affected and constrained by geographic features located in the corresponding geographic region.

For example, a first signal environment tile can have a first tile category (e.g., "rural"). A second geographic environment tile has a second category (e.g., "urban canyon"). The first tile category and the second tile category can indicate that density and heights of geographic features in a geographic region of the first signal environment tile are less than density and heights of geographic features in geographic region the second signal environment tile. The system can assign a lower uncertainty pseudorange or pseudorange rate uncertainty to the first tile than to the second tile, given a same satellite elevation.

Figure 11:
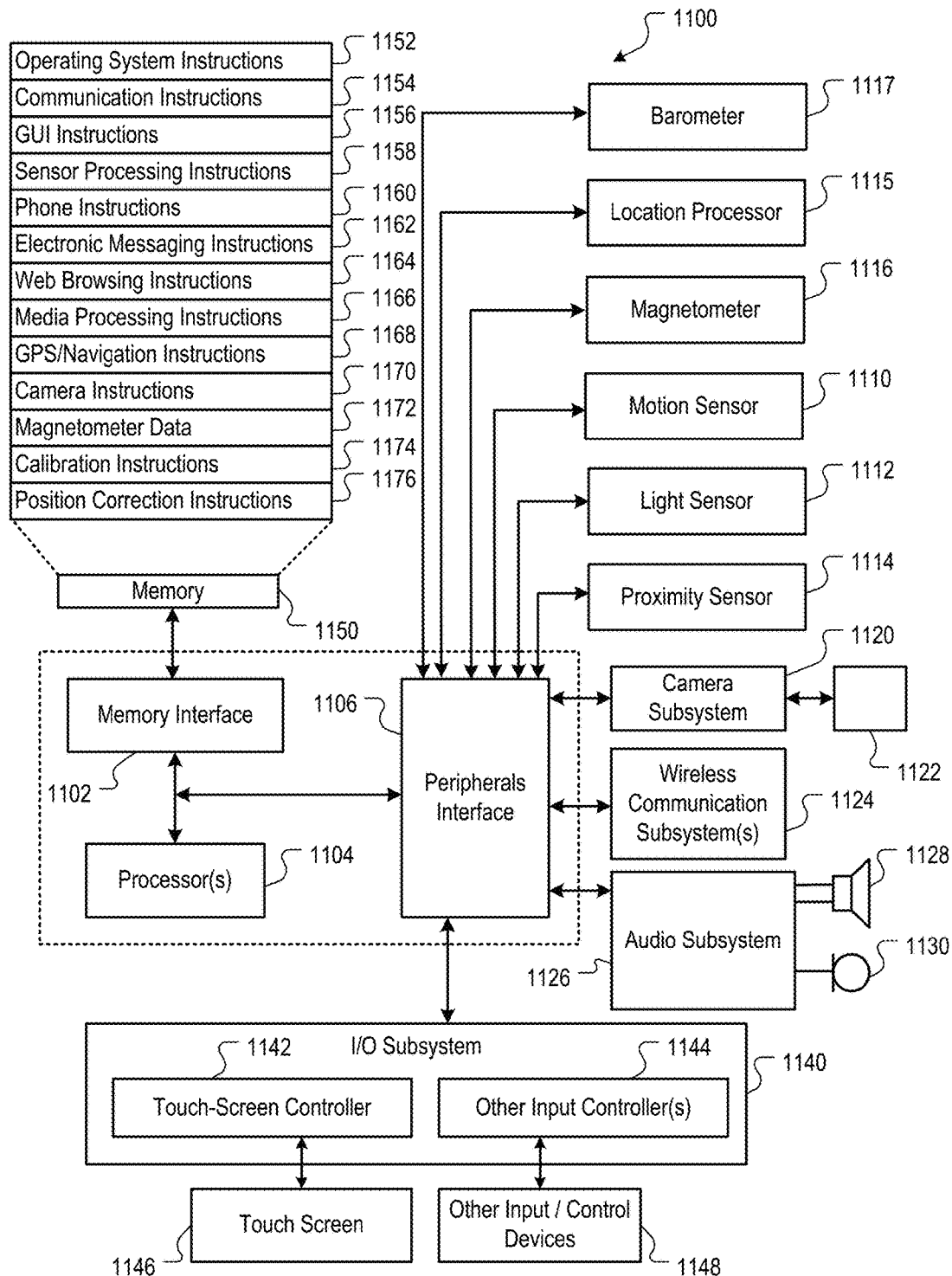
FIG. 11 is a block diagram illustrating an example device architecture of a mobile device implementing the features and operations described in reference to FIGS. 1-10.

Upon receiving a request that indicates an estimated position from a mobile device, the system can provide (1008) a tile category assigned to a signal environment tile of a geometric region enclosing the estimated position as a response to the request. One or more values (e.g., "dense urban," "urban canyon" or both) of a tile category can trigger the mobile device to perform various operations. These operations can include, for example, enabling an inertial sensor to aid GNSS positioning, providing correction information a GNSS receiver to improve performance of the GNSS receiver, performing positioning estimation using a processor that is different from a GNSS receiver In some implementations, a value (e.g., "urban canyon") of a tile category sent to a mobile device can trigger the mobile device to submit a second request for geographic feature data. The second request can include at least one of an identifier of a signal environment tile or an estimated position. The system can receive the second request from the mobile device. In response, the system can identify a signal environment tile based on the identifier or estimated position. The system geographic feature data in the identified signal environment tile to the mobile device as a response to the second request Exemplary Mobile Device Architecture FIG. 11 is a block diagram illustrating an exemplary device architecture 1100 of a mobile device implementing the features and operations described in reference to FIGS. 1-10C. A mobile device can include memory interface 1102, one or more data processors, image processors and/or processors 1104 and peripherals interface 1106. Memory interface 1102, one or more processors 1104 and/or peripherals interface 1106 can be separate components or can be integrated in one or more integrated circuits. Processors 1104 can include application processors, baseband processors and wireless processors. The various components in the mobile device, for example, can be coupled by one or more communication buses or signal lines.

Sensors, devices and subsystems can be coupled to peripherals interface 1106 to facilitate multiple functionalities. For example, motion sensor 1110, light sensor 1112 and proximity sensor 1114 can be coupled to peripherals interface 1106 to facilitate orientation, lighting and proximity functions of the mobile device. Location processor 1115 can be connected to peripherals interface 1106 to provide geopositioning. In some implementations, location processor 1115 can be program to perform the GNSS receiver 702. Electronic magnetometer 1116 (e.g., an integrated circuit chip) can also be connected to peripherals interface 1106 to provide data that can be used to determine the direction of magnetic North. Thus, electronic magnetometer 1116 can be used as an electronic compass. Motion sensor 1110 can include one or more accelerometers configured to determine change of speed and direction of movement of the mobile device. Barometer 1117 can include one or more devices connected to peripherals interface 1106 and configured to measure pressure of atmosphere around the mobile device.

Camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network (s) over which a mobile device is intended to operate. For example, a mobile device can include communication subsystems 1124 designed to operate over a GSM network, a GPRS network, an EDGE network, a Wi-Fi™ or WiMax™ network and a Bluetooth™ network. In particular, the wireless communication subsystems 1124 can include hosting protocols such that the mobile device can be configured as a base station for other wireless devices.

Audio subsystem 1126 can be coupled to a speaker 1128 and a microphone 1130 to facilitate voice-enabled functions, such as voice recognition, voice replication, digital recording and telephony functions. Audio subsystem 1126 can be configured to receive voice commands from the user.

I/O subsystem 1140 can include touch surface controller 1142 and/or other input controller(s) 1144. Touch surface controller 1142 can be coupled to a touch surface 1146 or pad. Touch surface 1146 and touch surface controller 1142 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 1146. Touch surface 1146 can include, for example, a touch screen.

Other input controller(s) 1144 can be coupled to other input/control devices 1148, such as one or more buttons, rocker switches, thumb-wheel, infrared port, USB port and/or a pointer device such as a stylus. The one or more buttons (not shown) can include an up/down button for volume control of speaker 1128 and/or microphone 1130.

In one implementation, a pressing of the button for a first duration may disengage a lock of the touch surface 1146; and a pressing of the button for a second duration that is longer than the first duration may turn power to the mobile device on or off. The user may be able to customize a functionality of one or more of the buttons. The touch surface 1146 can, for example, also be used to implement virtual or soft buttons and/or a keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 1102 can be coupled to memory 1150. Memory 1150 can include high-speed random access memory and/or non-volatile memory, such as one or more magnetic disk storage devices, one or more optical storage devices and/or flash memory (e.g., NAND, NOR). Memory 1150 can store operating system 1152, such as iOS, Darwin, RTXC, LINUX, UNIX, OS X, WINDOWS, or an embedded operating system such as VxWorks. Operating system 1152 may include instructions for handling basic system services and for performing hardware dependent tasks. In some implementations, operating system 1152 can include a kernel (e.g., UNIX kernel).

Memory 1150 may also store communication instructions 1154 to facilitate communicating with one or more additional devices, one or more computers and/or one or more servers. Memory 1150 may include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Location instructions 1168 to facilitate generic GNSS and location-related processes and instructions; camera instructions 1170 to facilitate camera-related processes and functions; magnetometer data 1172 and calibration instructions 1174 to facilitate magnetometer calibration. The memory 1150 may also store other software instructions (not shown), such as security instructions, web video instructions to facilitate web video-related processes and functions and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1150. Memory 1150 can store position correction instructions 1176 that, when executed by processor 1104, can cause processor 1104 to perform positioning correction operations, for example, the operations described above in various examples in reference to various figures.

Each of the above identified instructions and applications can correspond to a set of instructions for performing one or more functions described above. These instructions need not be implemented as separate software programs, procedures, or modules. Memory 1150 can include additional instructions or fewer instructions. Furthermore, various functions of the mobile device may be implemented in hardware and/or in software, including in one or more signal processing and/or application specific integrated circuits.

Figure 12:
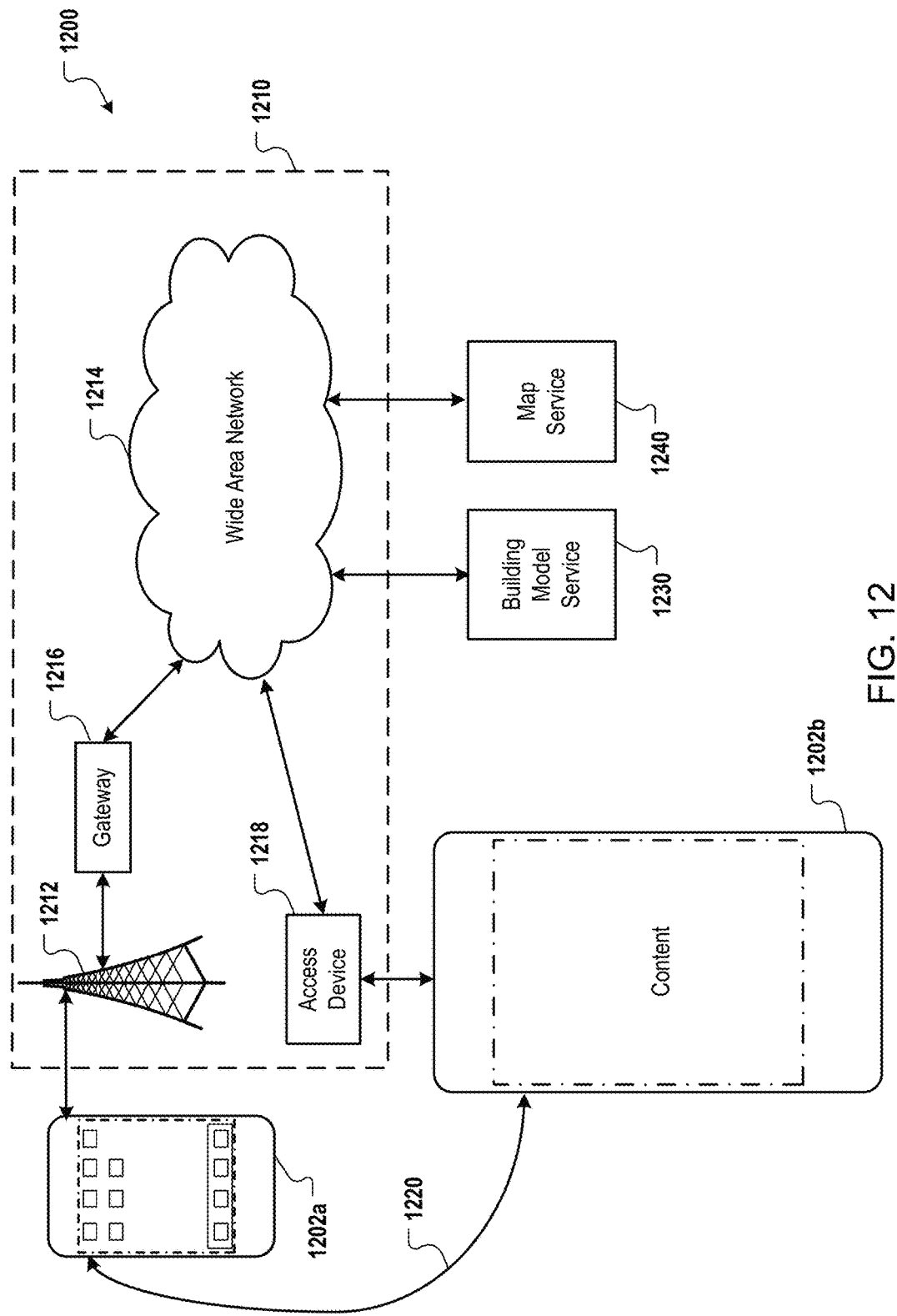
FIG. 12 is a block diagram of an example network operating environment for the mobile devices of FIGS. 1-10.

FIG. 12 is a block diagram of an example network operating environment 1200 for the mobile devices of FIGS. 1-10. Mobile devices 1202a and 1202b can, for example, communicate over one or more wired and/or wireless networks 1210 in data communication. For example, a wireless network 1212, e.g., a cellular network, can communicate with a wide area network (WAN) 1214, such as the Internet, by use of a gateway 1216. Likewise, an access device 1218, such as an 802.11g wireless access point, can provide communication access to the wide area network 1214. Each of mobile devices 1202a and 1202b can be mobile device 102.

In some implementations, both voice and data communications can be established over wireless network 1212 and the access device 1218. For example, mobile device 1202a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1212, gateway 1216, and wide area network 1214 (e.g., using Transmission Control Protocol/Internet Protocol (TCP/IP) or User Datagram Protocol (UDP)). Likewise, in some implementations, the mobile device 1202*b* can place and receive phone calls, send and receive e-mail messages, and retrieve electronic documents over the access device 1218 and the wide area network 1214. In some implementations, mobile device 1202*a* or 1202*b* can be physically connected to the access device 1218 using one or more cables and the access device 1218 can be a personal computer. In this configuration, mobile device 1202*a* or 1202*b* can be referred to as a "tethered" device.

Mobile devices 1202*a* and 1202*b* can also establish communications by other means. For example, wireless device 1202*a* can communicate with other wireless devices, e.g., other mobile devices, cell phones, etc., over the wireless network 1212. Likewise, mobile devices 1202*a* and 1202*b* can establish peer-to-peer communications 1220, e.g., a personal area network, by use of one or more communication subsystems, such as the Bluetooth™ communication devices. Other communication protocols and topologies can also be implemented.

The mobile device 1202*a* or 1202*b* can, for example, communicate with one or more services 1230 and 1240 over the one or more wired and/or wireless networks. For example, one or more building model services 1230 can provide signal environment tile data including tile categories and geographic feature data including 3D building models to mobile devices 1202*a* and 1202*b* from location server 502. Map service 1240 provide virtual maps for to mobile devices 1202*a* and 1202*b* for displaying estimated positions.

Mobile device 1202*a* or 1202*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 1202*a* or 1202*b*. Such access can be provided by invocation of a web browsing function or application (e.g., a browser) in response to a user touching, for example, a Web object.

Example System Architecture

Figure 13:
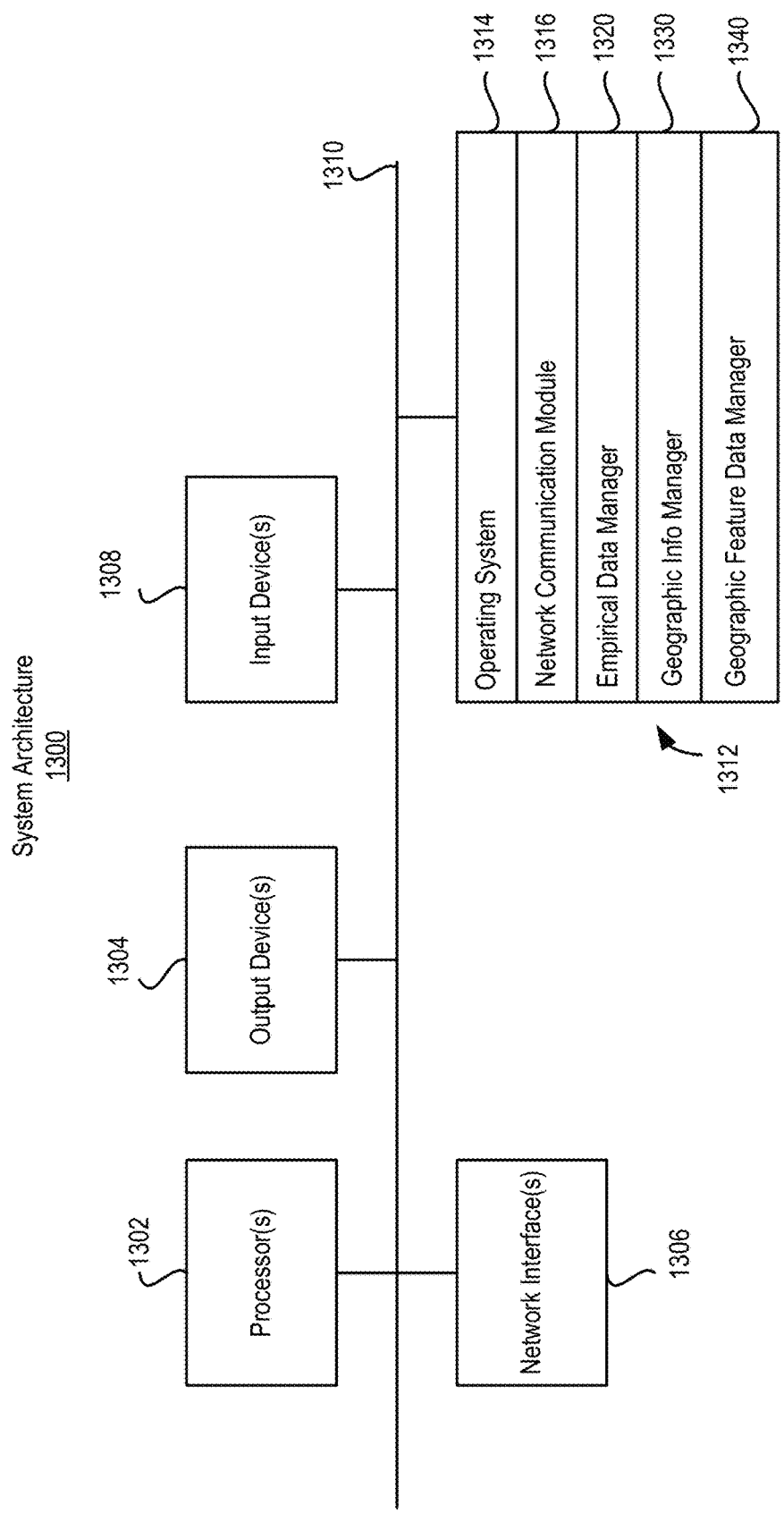
FIG. 13 is a block diagram of a system architecture for an example location server.

FIG. 13 is a block diagram of a system architecture for example location server 502. Other architectures are possible, including architectures with more or fewer components. In some implementations, architecture 1300 includes one or more processors 1302 (e.g., dual-core Intel® Xeon® Processors), one or more output devices 1304 (e.g., LCD), one or more network interfaces 1306, one or more input devices 1308 (e.g., mouse, keyboard, touch-sensitive display) and one or more computer-readable media 1312 (e.g., RAM, ROM, SDRAM, hard disk, optical disk, flash memory, etc.). These components can exchange communications and data over one or more communication channels 1310 (e.g., buses), which can utilize various hardware and software for facilitating the transfer of data and control signals between components.

The term "computer-readable medium" refers to a medium that participates in providing instructions to processor 1302 for execution, including without limitation, non-volatile media (e.g., optical or magnetic disks), volatile media (e.g., memory) and transmission media. Transmission media includes, without limitation, coaxial cables, copper wire and fiber optics.

Computer-readable media 1312 can further include operating system 1314 (e.g., a Linux® operating system), network communication module 1316, empirical data manager 1320, geographic information manager 1330 and geographic feature data manager 1340. Operating system 1314 can be multi-user, multiprocessing, multitasking, multithreading, real time, etc. Operating system 1314 performs basic tasks, including but not limited to: recognizing input from and providing output to network interfaces 1306 and/or devices 1308; keeping track and managing files and directories on computer-readable media 1312 (e.g., memory or a storage device); controlling peripheral devices; and managing traffic on the one or more communication channels 1310. Network communications module 1316 includes various components for establishing and maintaining network connections (e.g., software for implementing communication protocols, such as TCP/IP, HTTP, etc.).

Empirical data manager 1320 can include computer instructions that, when executed, cause processor 1302 to receive empirical data including data from experiments of GNSS signal interference caused by various geographic features in various terrains. The data can be tagged with a terrain types, which can correspond to tile category types. Geographic information manager 1330 can include computer instructions that, when executed, cause processor 1302 to receive geographic information from various sources and generate one or more 3D building models. Geographic feature data manager 1340 can include computer instructions that, when executed, cause processor 1302 to perform operations of generating signal information tiles using geographic information, assigning tile categories to the generated tiles, and provide geographic data and other tile information to a mobile device upon request.

Architecture 1300 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
   receiving, by a processor of a mobile device, an estimated position provided by a global navigation satellite system (GNSS) receiver, wherein the estimated position is determined based on one or more signal received by the GNSS receiver;
   determining, by the processor of the mobile device based on the estimated position, a plurality of candidate locations of the mobile device around the estimated position;
   receiving geographic feature data, the geographic feature data including locations and heights of geographic features that are estimated to interfere with the one or more signals received by the GNSS receiver;
   determining an estimated signal path for a first signal to reach from a satellite of the GNSS to the GNSS receiver, including determining one or more reflections of the first signal by the geographic features and determining an uncertainty value based on the candidate locations;
   estimating a Doppler correction of the first signal based on a count of the reflections in the signal path, wherein for each reflection, the processor inverts a sense of a vector of the Doppler correction; and
   providing the estimated Doppler correction to the GNSS receiver for estimating at least one of a position of the mobile device or a velocity of the mobile device.

2. The method of claim 1, wherein determining the candidate locations comprises determining a sampling grid around the estimated position and designating locations on the sampling grid as the candidate locations.

3. The method of claim 1, wherein determining the estimated signal path comprises determining a probability value associated with the signal path based on the candidate locations, wherein more candidate locations at which the GNSS receiver can receive the first signal along the estimated signal path corresponds to a higher probability value.

4. The method of claim 1, wherein estimating the Doppler correction comprises estimating a component of user velocity projected along a segment of the estimated signal path.

5. The method of claim 1, wherein estimating the Doppler correction comprises estimating an uncertainty value associated with the Doppler correction.

6. The method of claim 1, comprising:
estimating a carrier pseudorange Doppler shift between the satellite and the mobile device;
augmenting Kalman filter innovations and associated uncertainties using the Doppler correction; and
ordering the Kalman filter innovations based on updated uncertainties.

7. The method of claim 1, comprising determining a receiver clock error based on the Doppler correction.

8. A mobile device comprising:
a global navigation satellite system (GNSS) receiver including an interface to adjust coherent integration interval of processing GNSS signals;
one or more processors; and
a non-transitory computer-readable medium storing instructions that, when executed by the one or more processors, cause the one or more processors to perform operations comprising:
receiving, by a processor of the mobile device, an estimated position provided by the GNSS receiver, wherein the estimated position is determined based on one or more signal received by the GNSS receiver;
determining, by the processor of the mobile device based on the estimated position, a plurality of candidate locations of the mobile device around the estimated position;
receiving geographic feature data, the geographic feature data including locations and heights of geographic features that are estimated to interfere with the one or more signals received by the GNSS receiver;
determining an estimated signal path for a first signal to reach from a satellite of the GNSS to the GNSS receiver, including determining one or more reflections of the first signal by the geographic features and determining an uncertainty value based on the candidate locations;
estimating a Doppler correction of the first signal based on a count of the reflections in the signal path, wherein for each reflection, the processor inverts a sense of a vector of the Doppler correction; and
providing the estimated Doppler correction to the GNSS receiver for estimating at least one of a position of the mobile device or a velocity of the mobile device.

9. The mobile device of claim 8, wherein determining the candidate locations comprises determining a sampling grid around the estimated position and designating locations on the sampling grid as the candidate locations.

10. The mobile device of claim 8, wherein determining the estimated signal path comprises determining a probability value associated with the signal path based on the candidate locations, wherein more candidate locations at which the GNSS receiver can receive the first signal along the estimated signal path corresponds to a higher probability value.

11. The mobile device of claim 8, wherein estimating the Doppler correction comprises estimating a component of user velocity projected along a segment of the estimated signal path.

12. The mobile device of claim 8, wherein estimating the Doppler correction comprises estimating an uncertainty value associated with the Doppler correction.

13. The mobile device of claim 8, the operations comprising:
estimating a carrier pseudorange Doppler shift between the satellite and the mobile device;
augmenting Kalman filter innovations and associated uncertainties using the Doppler correction; and
ordering the Kalman filter innovations based on updated uncertainties.

14. The mobile device of claim 8, the operations comprising determining a receiver clock error based on the Doppler correction.

15. A non-transitory computer-readable medium storing instructions that, when executed by one or more processors, cause the one or more processors to perform operations comprising:
receiving, by a processor of a mobile device, an estimated position provided by a global navigation satellite system (GNSS) receiver, wherein the estimated position is determined based on one or more signal received by the GNSS receiver;
determining, by the processor of the mobile device based on the estimated position, a plurality of candidate locations of the mobile device around the estimated position;
receiving geographic feature data, the geographic feature data including locations and heights of geographic features that are estimated to interfere with the one or more signals received by the GNSS receiver;
determining an estimated signal path for a first signal to reach from a satellite of the GNSS to the GNSS receiver, including determining one or more reflections of the first signal by the geographic features and determining an uncertainty value based on the candidate locations;
estimating a Doppler correction of the first signal based on a count of the reflections in the signal path, wherein for each reflection, the processor inverts a sense of a vector of the Doppler correction; and
providing the estimated Doppler correction to the GNSS receiver for estimating at least one of a position of the mobile device or a velocity of the mobile device.

16. The non-transitory computer-readable medium of claim 15, wherein determining the candidate locations comprises determining a sampling grid around the estimated position and designating locations on the sampling grid as the candidate locations.

17. The non-transitory computer-readable medium of claim 15, wherein determining the estimated signal path comprises determining a probability value associated with the signal path based on the candidate locations, wherein more candidate locations at which the GNSS receiver can receive the first signal along the estimated signal path corresponds to a higher probability value.

18. The non-transitory computer-readable medium of claim 15, wherein estimating the Doppler correction comprises estimating a component of user velocity projected along a segment of the estimated signal path.

19. The non-transitory computer-readable medium of claim 15, wherein estimating the Doppler correction comprises estimating an uncertainty value associated with the Doppler correction.

20. The non-transitory computer-readable medium of claim 15, the operations comprising:
estimating a carrier pseudorange Doppler shift between the satellite and the mobile device;
augmenting Kalman filter innovations and associated uncertainties using the Doppler correction; and ordering the Kalman filter innovations based on updated uncertainties.

* * * * *

UNITED STATES PATENT AND TRADEMARK OFFICE
CERTIFICATE OF CORRECTION

PATENT NO. : 10,078,138 B2
APPLICATION NO. : 14/848241
DATED : September 18, 2018
INVENTOR(S) : Kumar Gaurav Chhokra and Glenn Donald MacGougan Page 1 of 1

It is certified that error appears in the above-identified patent and that said Letters Patent is hereby corrected as shown below:

In the Claims

Column 24, Line 32, delete "signal" and insert -- signals --;

Column 25, Line 25, delete "signal" and insert -- signals --; and

Column 26, Line 19, delete "signal" and insert -- signals --.

Signed and Sealed this
Fifth Day of March, 2019

Andrei Iancu
*Director of the United States Patent and Trademark Office*